(12) United States Patent
Zhu

(10) Patent No.: US 12,399,668 B2
(45) Date of Patent: Aug. 26, 2025

(54) PAGE DISPLAY METHOD AND APPARATUS, ELECTRONIC DEVICE, AND READABLE STORAGE MEDIUM

(71) Applicant: Huawei Technologies Co., Ltd., Shenzhen (CN)

(72) Inventor: Daojian Zhu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 18/259,301

(22) PCT Filed: Dec. 8, 2021

(86) PCT No.: PCT/CN2021/136516
§ 371 (c)(1),
(2) Date: Jun. 26, 2023

(87) PCT Pub. No.: WO2022/135157
PCT Pub. Date: Jun. 30, 2022

(65) Prior Publication Data
US 2024/0094972 A1   Mar. 21, 2024

(30) Foreign Application Priority Data

Dec. 25, 2020   (CN) .......................... 202011574227.9

(51) Int. Cl.
*G06F 3/14*      (2006.01)
*G06F 3/04842*   (2022.01)
(Continued)

(52) U.S. Cl.
CPC ........ *G06F 3/1438* (2013.01); *G06F 3/04842* (2013.01); *G06F 3/1454* (2013.01);
(Continued)

(58) Field of Classification Search
CPC .... G06F 16/957; G06F 3/1423; G06F 3/1454; G06Q 30/0277; G09G 5/14; H04L 67/02;
(Continued)

(56) References Cited

U.S. PATENT DOCUMENTS 11,006,187 B2 *  5/2021  Ryu .................. H04N 21/6377
2014/0068520 A1   3/2014  Missig et al.
(Continued)

FOREIGN PATENT DOCUMENTS

CN   112099705 A    12/2020
EP   3051425 A1    8/2016

*Primary Examiner* — Nelson M Rosario
(74) *Attorney, Agent, or Firm* — Conley Rose, P.C.

(57) ABSTRACT

A page display method and apparatus, an electronic device, and a readable storage medium are provided, and belong to the field of internet technologies. The method includes: A first electronic device displays a first page in a running application program (S701); the first electronic device closes the first page in response to a display operation initiated by a user on the first page, and sends a display instruction related to the first page to a second electronic device (S702); the second electronic device displays, in response to the display instruction, a second page associated with the first page on the second electronic device (S703). The method can resolve a problem that a user needs to manually perform program switching frequently, operations are cumbersome, and operation efficiency of an application program is reduced in an existing network page display technology.

18 Claims, 33 Drawing Sheets

(51) Int. Cl.
   *G06Q 30/0241* (2023.01)
   *G06Q 30/0601* (2023.01)
   *H04W 4/06* (2009.01)

(52) U.S. Cl.
   CPC ..... *G06Q 30/0277* (2013.01); *G06Q 30/0641* (2013.01); *H04W 4/06* (2013.01)

(58) Field of Classification Search
   CPC .................... H04M 1/72412; H04M 1/72445; H04W 4/06
   See application file for complete search history.

(56) References Cited

U.S. PATENT DOCUMENTS

2016/0337449 A1* 11/2016 Yang .................... H04L 67/06
2019/0114365 A1* 4/2019 Liu .................. G06K 19/06037

* cited by examiner

TO FIG. 15(b)

Mate 40 is in an unselected state

PAGE DISPLAY METHOD AND APPARATUS, ELECTRONIC DEVICE, AND READABLE STORAGE MEDIUM

CROSS-REFERENCE TO RELATED APPLICATIONS

This is a National Stage of International Patent Application No. PCT/CN2021/136516 filed on Dec. 8, 2021, which claims priority to Chinese Patent Application No. 202011574227.9 filed on Dec. 25, 2020. Both of the aforementioned applications are hereby incorporated by reference in their entireties.

TECHNICAL FIELD

This application belongs to the field of internet technologies, and in particular, to a page display method and apparatus, an electronic device, and a readable storage medium.

BACKGROUND

With the continuous development of internet technologies, information in the internet is becoming increasingly abundant, such as various types of advertisements, news, and short videos. The information may be displayed on an electronic device through a network page, to facilitate viewing and understanding by a user. Generally, when running some application programs, the electronic device may display, in a manner such as a pop-up window or a prompt box, information that needs to be pushed. If the user needs to learn of details of the information or perform a corresponding operation (such as purchasing and downloading) based on the displayed information, a corresponding page may be jumped to, to switch a currently running application program to run in a background. After performing the corresponding operation, the user manually switches the originally running application program to run in a foreground. However, the foregoing manner affects continuity of running of the current application program, and requires the user to manually perform program switching frequently. Consequently, operations are cumbersome, and operation efficiency of an application program is reduced.

SUMMARY

Embodiments of this application provide a page display method and apparatus, an electronic device, and a computer-readable storage medium, to resolve a problem that a user needs to manually perform program switching frequently, operations are cumbersome, and operation efficiency of an application program is reduced in an existing network page display technology.

According to a first aspect, embodiments of this application provide a page display method, including:

A first electronic device displays a first page in a running application program.

The first electronic device closes the first page in response to a display operation initiated by a user on the first page, and sends a display instruction related to the first page to a second electronic device. It should be noted that the second electronic device is specifically another electronic device different from the first electronic device. For example, the first electronic device may be an electronic device that is being used by the user; the second electronic device may be an electronic device that is not being used by the user, or an electronic device used by another user.

The second electronic device displays, in response to the display instruction, a second page associated with the first page on the second electronic device.

Embodiments of this application that are implemented have the following beneficial effects: A first page that carries information that needs to be pushed is displayed on the first electronic device, a display instruction is sent to an interconnected second electronic device when a display operation initiated by the user on the first page is received, and the first page is closed locally on the first electronic device, and an application program continues to run in a foreground. In addition, after receiving the display instruction sent by the first electronic device, the second electronic device may display the second page associated with the first page on the second electronic device. This avoids that the user needs to switch application programs frequently when obtaining detailed information on the first page or performing a corresponding operation on information content on the first page. Continuity of running of the application program is maintained, and operation efficiency of the application program may also be improved.

In a possible implementation of the first aspect, that the first electronic device closes the first page in response to a display operation initiated by a user on the first page, and sends a display instruction related to the first page to a second electronic device includes:

The first electronic device obtains, through an application layer, the display operation initiated by the user in the application program, and generates, through the application layer, a broadcast signal carrying the display instruction.

The first electronic device sends the broadcast signal to the second electronic device.

The second electronic device sends an acknowledgment signal to the first electronic device in response to the received broadcast signal.

In a possible implementation of the first aspect, after the first electronic device sends the broadcast signal to the second electronic device, the method further includes:

If an application framework layer of the first electronic device does not receive the acknowledgment signal fed back by the second electronic device, the first electronic device sends a local display instruction to the application layer through the application framework layer.

The application layer of the first electronic device displays the second page on the first electronic device in response to the received local display instruction.

In a possible implementation of the first aspect, after the first electronic device sends the broadcast signal to the second electronic device, the method further includes:

If the second electronic device is in an occupied state, the second electronic device sends a device occupation signal to the first electronic device.

The first electronic device sends, in response to the device occupation signal, a local display instruction to the application layer through an application framework layer.

The application layer of the first electronic device displays the second page on the first electronic device in response to the received local display instruction.

In a possible implementation of the first aspect, that the first electronic device closes the first page in response to a display operation initiated by a user on the first page, and sends a display instruction related to the first page to a second electronic device includes:

The first electronic device generates a selectable device list in response to the display operation, where the selectable device list includes a first identifier of the first electronic device and a second identifier of at least one candidate electronic device that establishes an interconnection relationship with the first electronic device.

The first electronic device identifies, in response to a selection operation that is related to any second identifier and that is initiated by the user, a candidate electronic device corresponding to the selected second identifier as the second electronic device.

The first electronic device closes the first page and the selectable device list, and sends the display instruction to the second electronic device.

In a possible implementation of the first aspect, after the first electronic device generates a selectable device list in response to the display operation, the method further includes:

The first electronic device switches, in response to a selection operation that is related to the first identifier and that is initiated by the user, the application program to run in a background of the first electronic device.

The first electronic device displays the second page.

In a possible implementation of the first aspect, that the first electronic device generates a selectable device list in response to the display operation includes:

The first electronic device receives, through a wireless communication module, a wireless communication signal that is broadcast by each candidate electronic device, where each wireless communication signal carries the second identifier of the candidate electronic device.

The first electronic device generates the selectable device list based on all the received wireless communication signals.

According to a second aspect, embodiments of this application provide a page display method, applied to a first electronic device. The method includes:

The first electronic device displays a first page in a running application program.

The first electronic device closes the first page in response to a display operation initiated by a user on the first page, and sends a display instruction related to the first page to a second electronic device, so that the second electronic device displays, after receiving the display instruction, a second page associated with the first page on the second electronic device.

In a possible implementation of the second aspect, that the first electronic device closes the first page in response to a display operation initiated by a user on the first page, and sends a display instruction related to the first page to a second electronic device includes:

The first electronic device obtains, through an application layer, the display operation initiated by the user in the application program, and generates, through the application layer, a broadcast signal carrying the display instruction.

The first electronic device sends the broadcast signal to the second electronic device.

If the first electronic device receives, through an application framework layer, an acknowledgment signal that is fed back by the second electronic device based on the broadcast signal, the first electronic device identifies that the second electronic device has displayed the second page.

In a possible implementation of the second aspect, after the first electronic device sends the broadcast signal to the second electronic device, the method further includes:

If the application framework layer of the first electronic device does not receive the acknowledgment signal fed back by the second electronic device, or receives a device occupation signal fed back by the second electronic device, the first electronic device sends a local display instruction to the application layer through the application framework layer.

The application layer of the first electronic device displays the second page on the first electronic device in response to the received local display instruction.

In a possible implementation of the second aspect, that the first electronic device closes the first page in response to a display operation initiated by a user on the first page, and sends a display instruction related to the first page to a second electronic device includes:

The first electronic device generates a selectable device list in response to the display operation, where the selectable device list includes a first identifier of the first electronic device and a second identifier of at least one candidate electronic device that establishes an interconnection relationship with the first electronic device.

The first electronic device identifies, in response to a selection operation that is related to any second identifier and that is initiated by the user, a candidate electronic device corresponding to the selected second identifier as the second electronic device.

The first electronic device closes the first page and the selectable device list, and sends the display instruction to the second electronic device.

In a possible implementation of the second aspect, after the first electronic device generates a selectable device list in response to the display operation, the method further includes:

The first electronic device switches, in response to a selection operation that is related to the first identifier and that is initiated by the user, the application program to run in a background of the first electronic device.

The first electronic device displays the second page.

In a possible implementation of the second aspect, that the first electronic device generates a selectable device list in response to the display operation includes:

The first electronic device receives, through a wireless communication module, a wireless communication signal that is broadcast by each candidate electronic device, where each wireless communication signal carries the second identifier of the candidate electronic device.

The first electronic device generates the selectable device list based on all the received wireless communication signals.

According to a third aspect, embodiments of this application provide a page display apparatus, including: a first page display unit, configured to display a first page in a running application program; and a display instruction sending unit, configured to close the first page in response to a display operation initiated by a user on the first page, and send a display instruction related to the first page to a second electronic device, so that the second electronic device displays, after receiving the display instruction, a second page associated with the first page on the second electronic device.

In a possible implementation of the third aspect, the display instruction sending unit includes:
  a broadcast signal generation unit, configured to obtain, through an application layer, the display operation initiated by the user in the application program, and generate, through the application layer, a broadcast signal carrying the display instruction;
  a broadcast signal sending unit, configured to send the broadcast signal to the second electronic device; and
  an acknowledgment signal receiving unit, configured to:
    if an acknowledgment signal that is fed back by the second electronic device based on the broadcast signal is received through an application framework layer, identify that the second electronic device has displayed the second page.

In a possible implementation of the third aspect, the page display apparatus further includes:

an unavailability response unit, configured to: if the application framework layer of the first electronic device does not receive the acknowledgment signal fed back by the second electronic device, or receives a device occupation signal fed back by the second electronic device, send a local display instruction to the application layer through the application framework layer; and a local display instruction execution unit, configured to display, by the application layer, the second page on the first electronic device in response to the received local display instruction.

In a possible implementation of the third aspect, the display instruction sending unit includes:

a selectable device list generation unit, configured to generate a selectable device list in response to the display operation, where the selectable device list includes a first identifier of the first electronic device and a second identifier of at least one candidate electronic device that establishes an interconnection relationship with the first electronic device;

a second identifier response unit, configured to identify, in response to a selection operation that is related to any second identifier and that is initiated by the user, a candidate electronic device corresponding to the selected second identifier as the second electronic device; and a remote display execution unit, configured to close, the first page and the selectable device list, and send the display instruction to the second electronic device.

In a possible implementation of the third aspect, the page display apparatus further includes:

a first identifier response unit, configured to switch, in response to a selection operation that is related to the first identifier and that is initiated by the user, the application program to run in a background of the first electronic device; and a local display unit, configured to display the second page.

In a possible implementation of the third aspect, the selectable device list generation unit includes:

a wireless communication signal obtaining unit, configured to receive, through a wireless communication module, a wireless communication signal that is broadcast by each candidate electronic device, where each wireless communication signal carries the second identifier of the candidate electronic device; and a wireless signal identification unit, configured to generate the selectable device list based on all the received wireless communication signals.

According to a fourth aspect, embodiments of this application provide a page display method, applied to a second electronic device. The method includes:

The second electronic device receives a display instruction sent by a first electronic device, where the display instruction is sent by the first electronic device to the second electronic device in response to a display operation initiated by a user on a first page, and the first page is a page displayed by the first electronic device in a running application program.

The second electronic device displays a second page associated with the first page.

In a possible implementation of the fourth aspect, that the second electronic device receives a display instruction sent by a first electronic device includes:

The second electronic device receives a broadcast signal that carries the display instruction and that is sent by the first electronic device.

The second electronic device sends an acknowledgment signal to the first electronic device in response to the broadcast signal.

In a possible implementation of the fourth aspect, after the second electronic device receives a broadcast signal that carries the display instruction and that is sent by the first electronic device, the method further includes:

If the second electronic device is in an occupied state, the second electronic device sends a device occupation signal to the first electronic device, to cause the second page to be displayed on the first electronic device.

According to a fifth aspect, embodiments of this application provide a page display apparatus, including:

a display instruction receiving unit, configured to receive a display instruction sent by a first electronic device, where the display instruction is sent by the first electronic device to the second electronic device in response to a display operation initiated by a user on a first page, and the first page is a page displayed by the first electronic device in a running application program; and a remote display unit, configured to display a second page associated with the first page.

In a possible implementation of the fifth aspect, the display instruction receiving unit includes:

a broadcast signal receiving unit, configured to receive a broadcast signal that carries the display instruction and that is sent by the first electronic device; and an acknowledgment signal sending unit, configured to send an acknowledgment signal to the first electronic device in response to the broadcast signal.

In a possible implementation of the fifth aspect, the page display apparatus further includes:

an occupation state response unit, configured to: if the second electronic device is in an occupied state, send a device occupation signal to the first electronic device, to cause the second page to be displayed on the first electronic device.

According to a sixth aspect, embodiments of this application provide an electronic device, a memory, a processor, and a computer program that is stored in the memory and that can be executed on the processor. When the processor executes the computer program, the page display method according to any one of the possible implementations of the second aspect or the page display method according to any one of the possible implementations of the fourth aspect is implemented.

According to a seventh aspect, embodiments of this application provide a computer-readable storage medium. The computer-readable storage medium stores a computer program; and when the computer program is executed by a processor, the page display method according to any one of the possible implementations of the second aspect or the page display method according to any one of the possible implementations of the fourth aspect is implemented.

According to an eighth aspect, embodiments of this application provide a computer program product. When the computer program product is run on an electronic device, the electronic device is enabled to perform the page display method according to any one of the possible implementations of the second aspect or the page display method according to any one of the possible implementations of the fourth aspect.

According to a ninth aspect, embodiments of this application provide a chip system, including a processor. The processor is coupled to a memory, and the processor executes a computer program stored in the memory, to implement the page display method according to any one of the possible implementations of the second aspect or the page display method according to any one of the possible implementations of the fourth aspect.

According to a tenth aspect, embodiments of this application provide a page display system, including the page display apparatus according to the second aspect and the page display apparatus according to the fourth aspect.

It may be understood that for beneficial effects of the second aspect to the tenth aspect, refer to related descriptions in the first aspect. Details are not described herein again.

DESCRIPTION OF EMBODIMENTS

Figure 1:
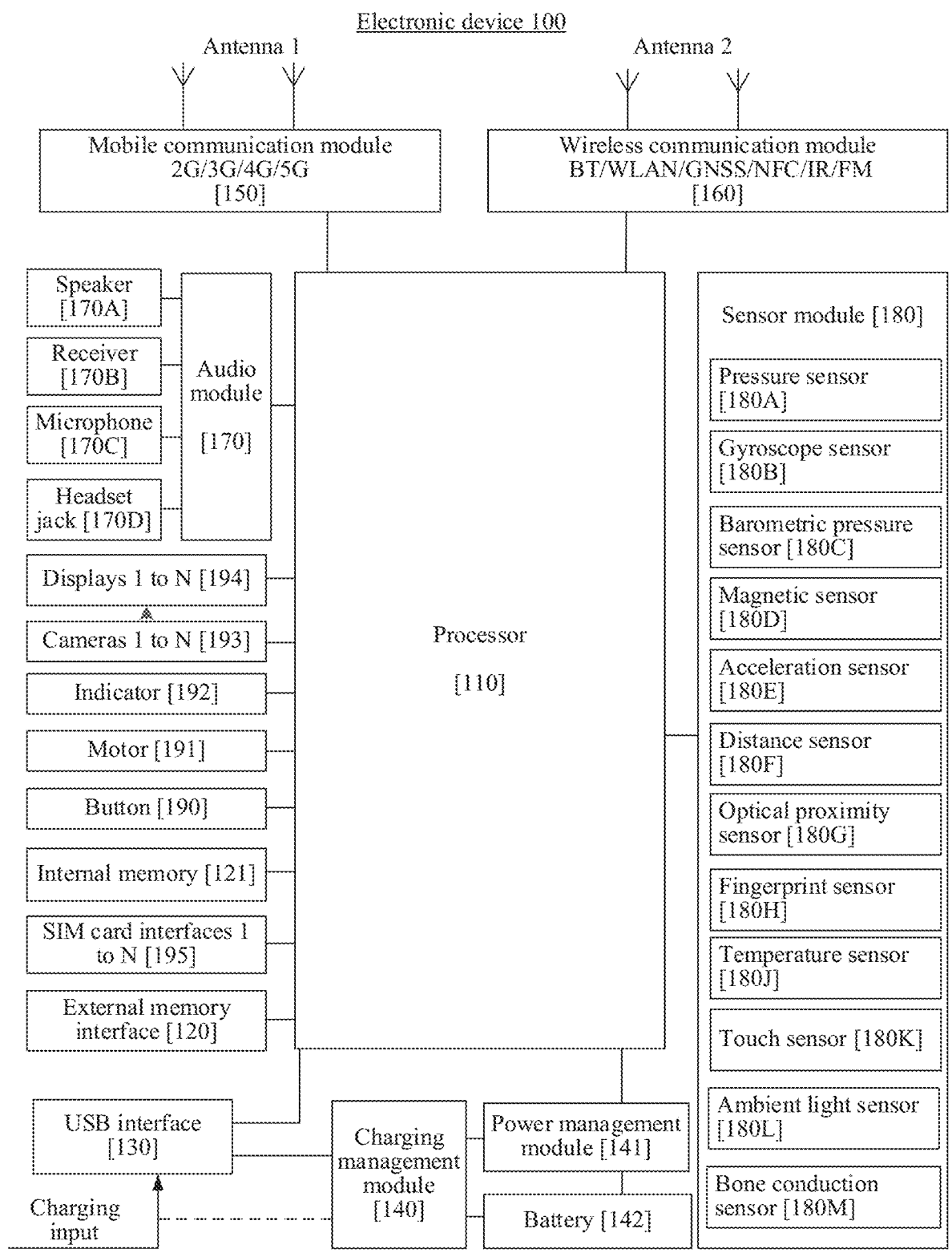
FIG. 1 is a schematic diagram of a structure of an electronic device according to an embodiment of this application.

In the following descriptions, for description instead of limitation, specific details such as a specific system structure and technology are provided, to thoroughly understand embodiments of this application. However, a person skilled in the art should know that this application may be implemented in other embodiments without these specific details. In other cases, detailed description of a well-known system, apparatus, circuit, and method is omitted, so as not to interfere with the description of this application by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and appended claims of this application, the terms "first", "second", "third", and the like are merely intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "comprise", "include", "have", and variants thereof all mean "include but are not limited to", unless otherwise specifically emphasized in another manner.

The page display method provided in embodiments of this application may be applied to an electronic device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

For example, the electronic device may be a station (STATION, ST) in a WLAN, and may be a cellular phone, a cordless phone, a session initiation protocol (Session Initiation Protocol, SIP) phone, or a wireless local loop (Wireless Local Loop, WLL) station, a personal digital assistant (personal digital assistant, PDA) device, a handheld device having a wireless communication function, a computing device, another processing device connected to a wireless modem, a computer, a laptop computer, a handheld communication device, a handheld computing device, and/or another device that performs communication in a wireless system and a next-generation communication system, for example, a mobile terminal in a 5G network or a mobile terminal in a future evolved public land mobile network (Public Land Mobile Network, PLMN) network.

FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured to transmit a control signal, or may be configured to transmit a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device. Alternatively, the USB interface may be configured to connect to a headset for playing audio through the headset. The interface may alternatively be configured to connect to another electronic device such as an AR device.

It may be understood that an interface connection relationship between the modules illustrated in embodiments of this application is merely an example for description, and constitutes no limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from a charger. The charger may be a wireless charger or may be a wired charger. In some embodiments of wired charging, the charging management module 140 may receive a charging input from the wired charger through the USB interface 130. In some embodiments of wireless charging, the charging management module 140 may receive wireless charging input through a wireless charging coil of the electronic device 100. When charging the battery 142, the charging management module 140 may further supply power to the electronic device through the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may be further reused, to improve antenna utilization. For example, the antenna 1 may be multiplexed as a diversity antenna of a wireless local area network. In some other embodiments, the antennas may be used in combination with a tuning switch.

The mobile communication module 150 may provide a solution to wireless communication such as 2G/3G/4G/5G applicable to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to an application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more devices integrating at least one communication processing module. In particular, the wireless communication module 160 includes at least a near field communication NFC module, to establish a file sharing link through the NFC module.

The electronic device 100 implements a display function through the GPU, the display 194, the application processor, and the like. The GPU is a microprocessor for image processing, and is connected to the display 194 and the application processor. The GPU is configured to perform mathematical and geometric calculations and to render graphics. The processor 110 may include one or more GPUs and execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1. The display 194 may include a touch panel and another input device.

The electronic device 100 can implement a photographing function through the ISP, the camera 193, the video codec, the GPU, the display 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a photographing scene. In some embodiments, the ISP may be disposed in the camera 193.

The camera 193 is configured to capture a static image or a video. An optical image of an object is generated through a lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computation processor. The NPU quickly processes input information by referring to a structure of a biological neural network, for example, by referring to a mode of transmission between human brain neurons, and continuously performs self-learning. Applications such as intelligent cognition of the electronic device 100 may be implemented through the NPU, for example, image recognition, facial recognition, speech recognition, and text understanding.

The external memory interface 120 may be configured to connect to an external storage card such as a micro SD card, to expand a storage capability of the electronic device 100. The external memory card communicates with the processor 110 through the external memory interface 120, to implement a data storage function. For example, a file, such as music or a video, is stored in the external storage card.

The internal memory 121 may be configured to store computer-executable program code. The executable program code includes instructions. The internal memory 121 may include a program storage region and a data storage region. The program storage area may store an operating system, an application program required by at least one function (such as a sound playing function or an image playing function), and the like. The data storage area may store data (such as audio data and an address book) created during use of the electronic device 100, and the like. In addition, the internal memory 121 may include a high-speed random access memory, or may include a non-volatile memory such as at least one magnetic disk memory, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, such as music playing or recording.

The audio module 170 is configured to convert digital audio information into an analog audio signal output, and is further configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in navigation and a motion sensing game scene.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 1803 is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transmit the detected touch operation to the application processor, to determine a touch event type. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. Types of the plurality of cards may be the same or different. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this application, the software structure of the electronic device 100 is illustrated by using an Android system with a layered architecture as an example.

Figure 2:
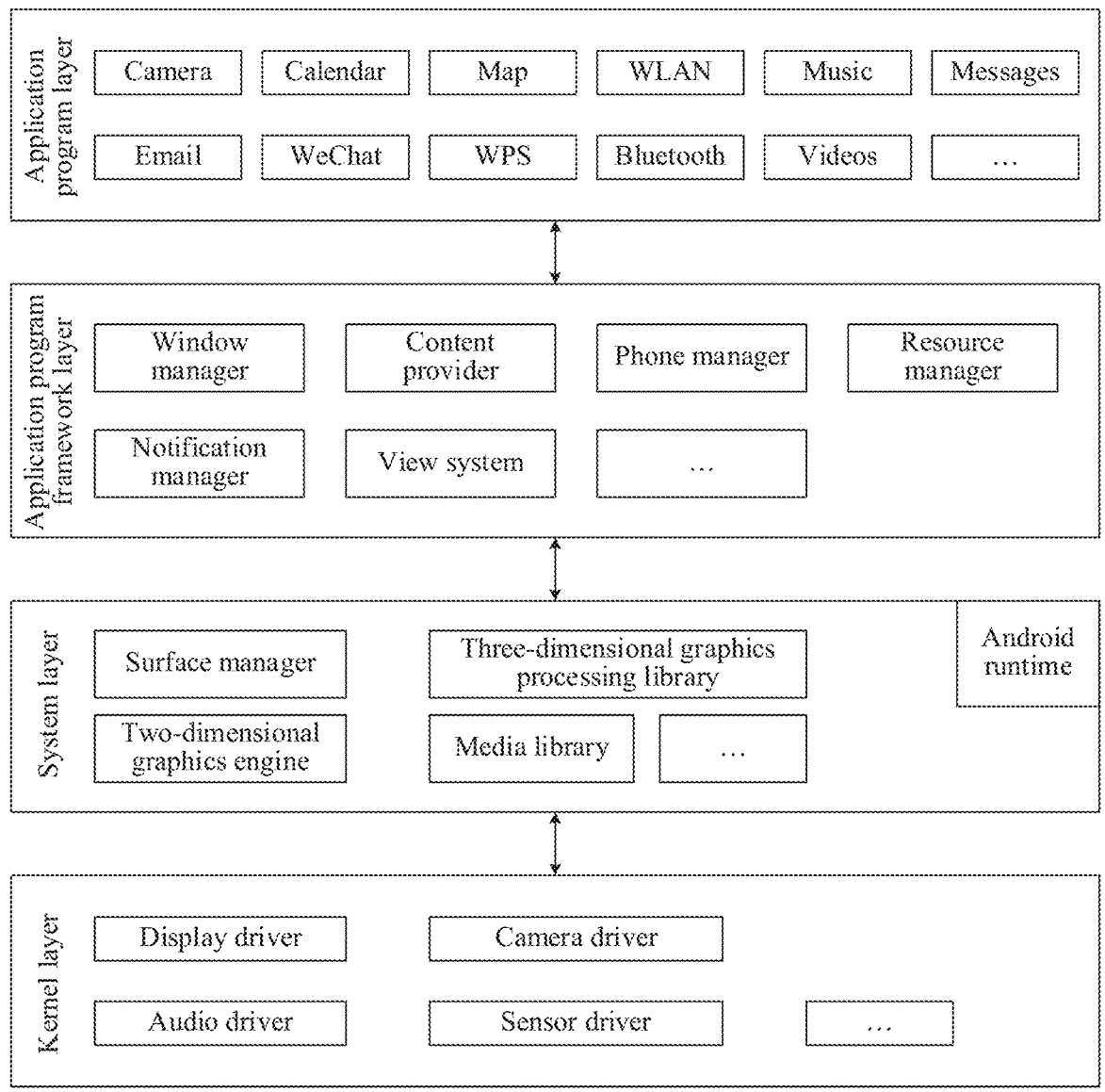
FIG. 2 is a block diagram of a software structure of an electronic device according to an embodiment of this application.

FIG. 2 is a block diagram of a software structure of an electronic device according to an embodiment of this application.

In a layered architecture, software is divided into several layers, and each layer has a clear role and task. Layers communicate with each other through a software interface. In some embodiments, the Android system is divided into four layers: an application layer, an application program framework layer, an Android runtime (Android runtime) and system library, and a kernel layer from top to bottom.

The application program layer may include a series of application program packages.

As shown in FIG. 2, the application program packages may include application programs such as Camera, Gallery, Calendar, Phone, Map, Navigation, WLAN, Bluetooth, Music, Videos, and Messages.

The application program framework layer provides an application programming interface (application programming interface, API) and a programming framework for the applications at the application program layer. The application program framework layer includes some predefined functions.

As shown in FIG. 2, the application program framework layer may include a window manager, a content provider, a view system, a phone manager, a resource manager, a notification manager, and the like.

The window manager is configured to manage a window application program. The window manager may obtain a size of a display screen, determine whether there is a status bar, lock the screen, capture the screen, and the like.

The content provider is configured to store and obtain data, so that the data can be accessed by an application program. The data may include a video, an image, an audio, calls that are made and answered, a browsing history and bookmarks, an address book, and the like.

The view system includes a visual control such as a control for text display or a control for picture display. The view system may be configured to construct an application program. A display interface may be formed by one or more views. For example, a display interface including an SMS notification icon may include a view for displaying text and a view for displaying a picture.

The phone manager is configured to provide a communication function of the electronic device, for example, management of a call status (including answering, declining, or the like).

The resource manager provides various resources for an application program, for example, a localized character string, an icon, a picture, a layout file, and a video file.

The notification manager enables an application program to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears in a top status bar of the system in a form of a graph or a scroll bar text, for example, a notification of an application program that is run in a background, or may be a notification that appears on the screen in a form of a dialog window. For example, text information is displayed in the status bar, an announcement is given, the electronic device vibrates, or the indicator light blinks.

The Android Runtime includes a kernel library and a virtual machine. The Android runtime is responsible for scheduling and managing the Android system.

The kernel library includes two parts: One part is a performance function that the Java language needs to invoke, and the other part is a kernel library of Android.

The application program layer and the application program framework layer run on the virtual machine. The virtual machine executes java files of the application program layer and the application program framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem, and converge 2D and 3D layers of a plurality of application programs.

The media library supports playback and recording of a plurality of common audio and video formats, a static image file, and the like. The media library may support a plurality of audio and video encoding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawings.

The kernel layer is a layer between hardware and software. The kernel layer includes at least a display drive, a camera drive, an audio drive, and a sensor drive.

Figure 3A:
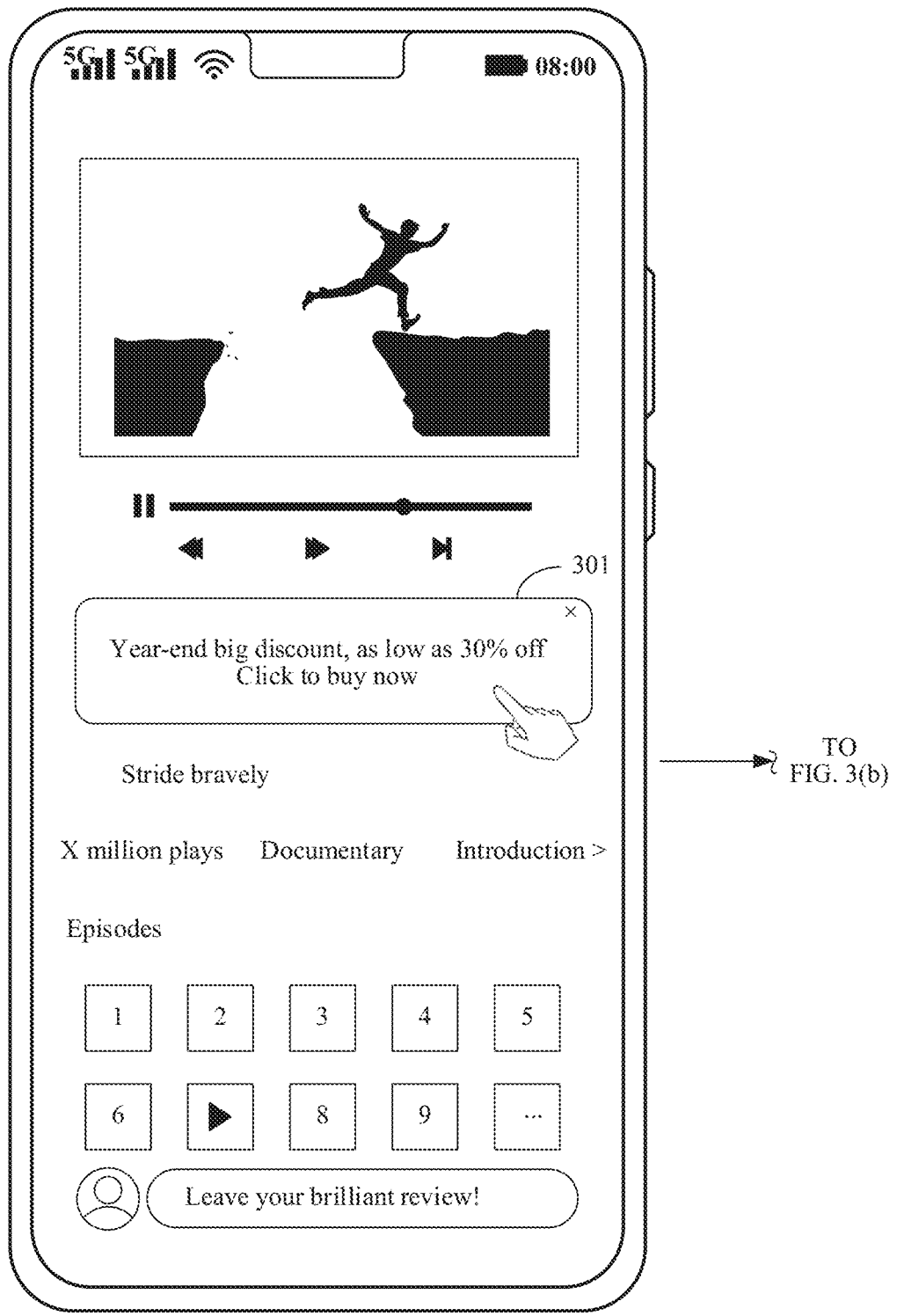
FIG. 3(a), FIG. 3(b), and FIG. 3(c) are schematic diagrams of an implementation of an existing information promotion technology.
Figure 3B:
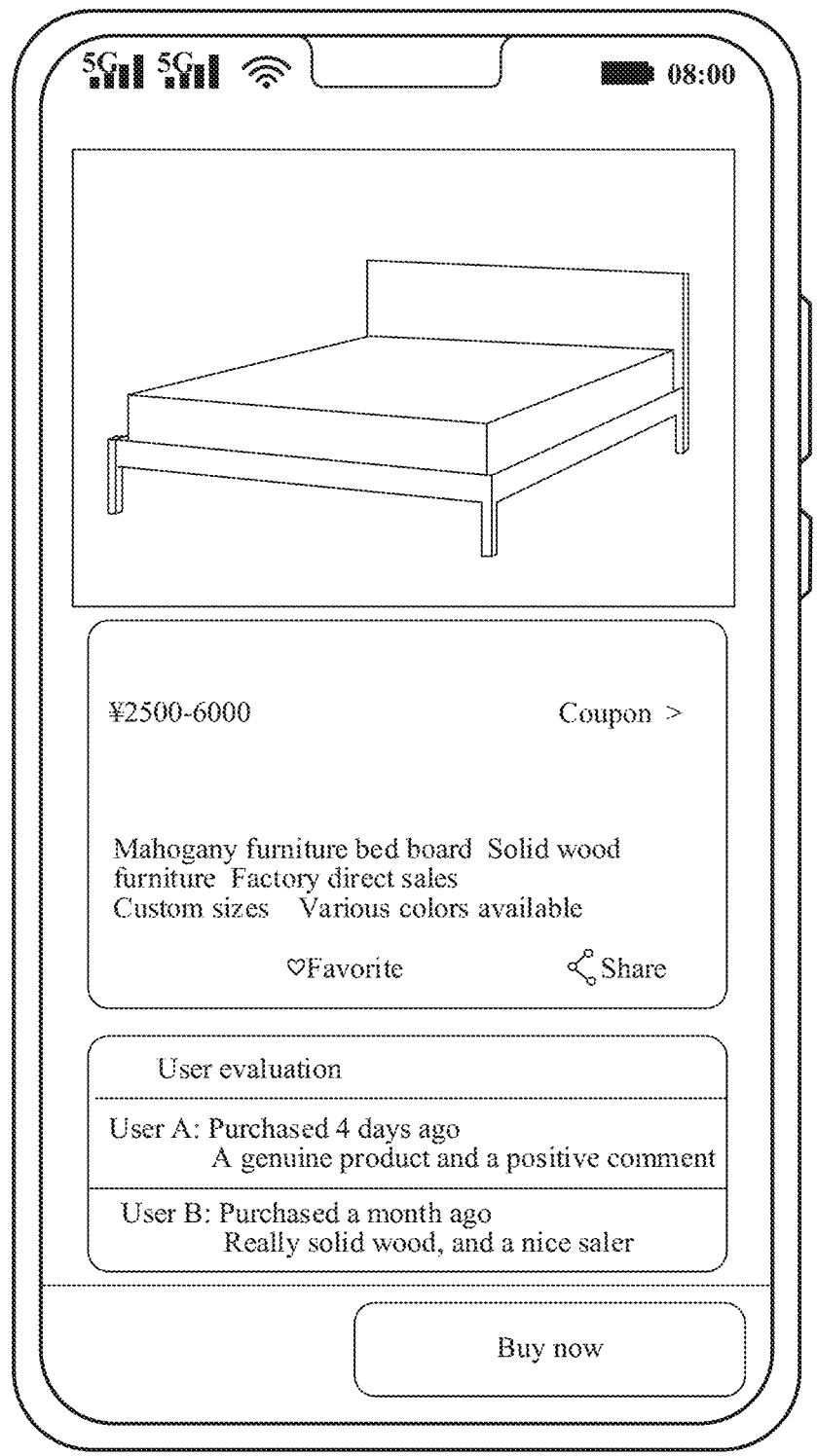
Figure 3C:
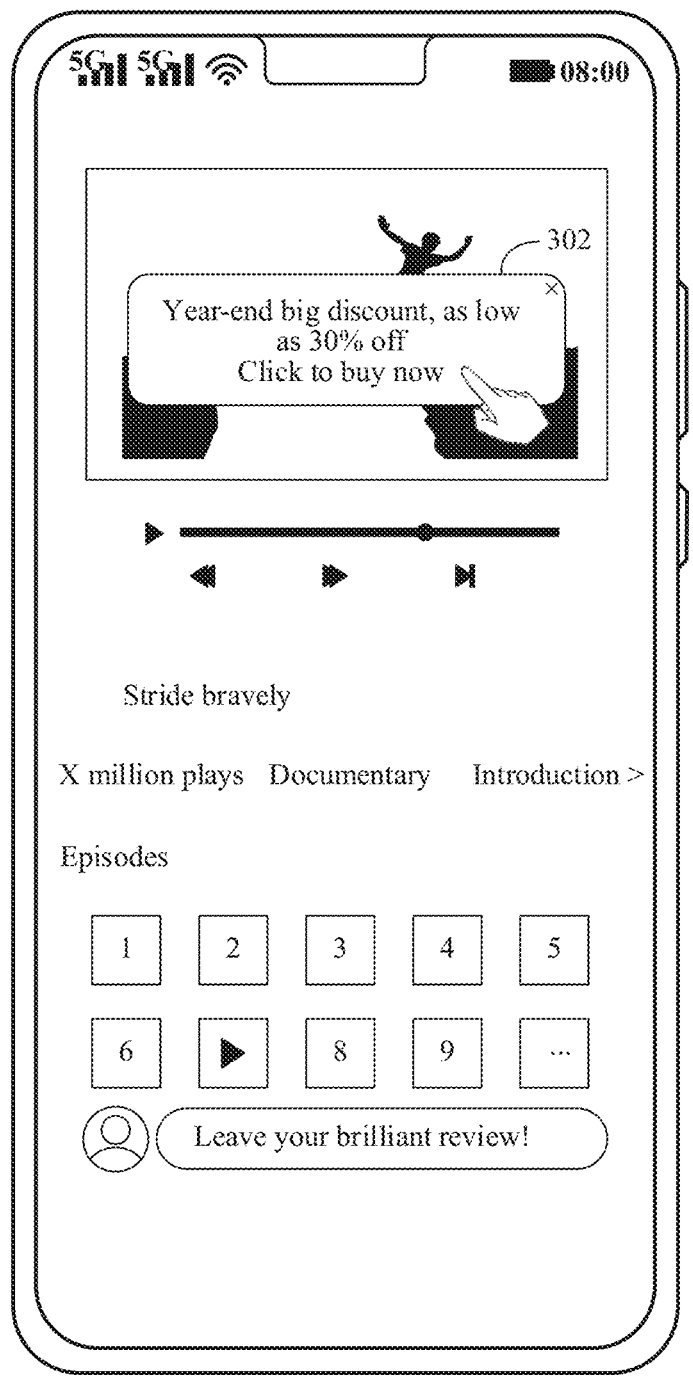

With the development of the internet technology, information in the internet is increasingly abundant. How to improve an exposure degree of the information has become one of the important links of information promotion. For example, FIG. 3(a), FIG. 3(b), and FIG. 3(c) are schematic diagrams of an implementation of an existing information promotion technology. As shown in FIG. 3(a), in an existing information promotion technology, a corresponding information promotion area may be configured on a page, and the information promotion area is used to display information that needs to be pushed, for example, an advertisement image or an advertisement video. The user may click the information promotion area, namely, an area 301, on a currently displayed page, to jump to a page associated with the information that needs to be pushed. As shown in FIG. 3(b), on an entire page in FIG. 3(b), detailed content of the information that needs to be pushed may be displayed, and the user may browse the detailed content on a page associated with the information, or perform a corresponding operation, such as purchase, payment, and download. As shown in FIG. 3(c), in addition to configuring a fixed information promotion area on an operation page of an application program, information that needs to be promoted may further be displayed in a manner such as a pop-up window or a prompt bar in a running application program, for example, a pop-up window 302 in FIG. 3(c). After detecting that the user clicks the pop-up window 302, the electronic device may jump to a page associated with the information that needs to be pushed, as shown in FIG. 3(b). Similarly, the user may browse detailed content of the information or perform a corresponding operation on the page associated with the information. In an existing information promotion technology, a part of content of the information that needs to be pushed is generally displayed. When the user is interested in the information or needs to learn in detail, the user may click the promotion display area or pop-up window, to display all content of the information that needs to be promoted. To be specific, a dedicated page of the information that needs to be promoted is generated.

Figure 4A:
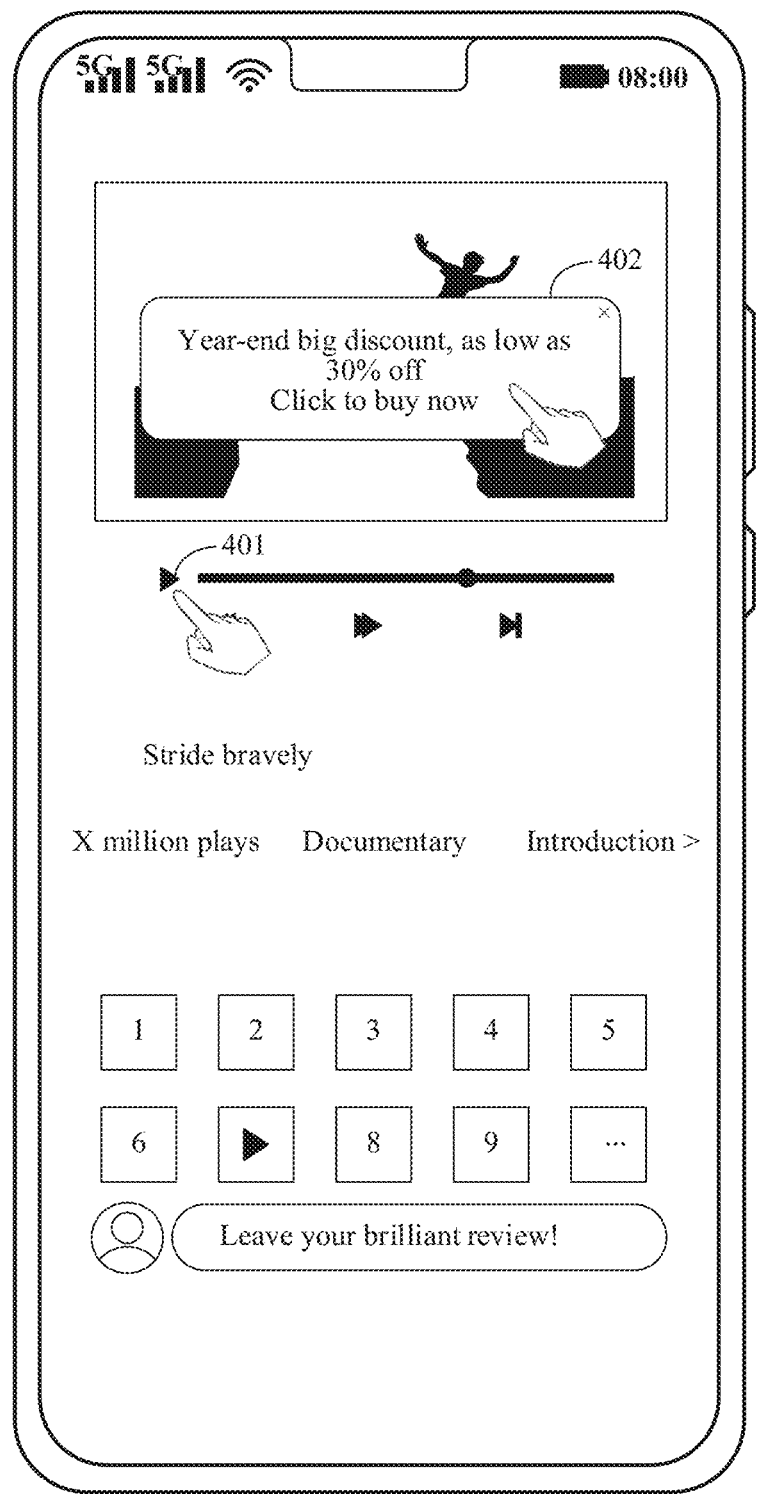
FIG. 4(a), FIG. 4(b), FIG. 4(c), and FIG. 4(d) are schematic diagrams of information promotion based on an existing video application program.
Figure 4B:
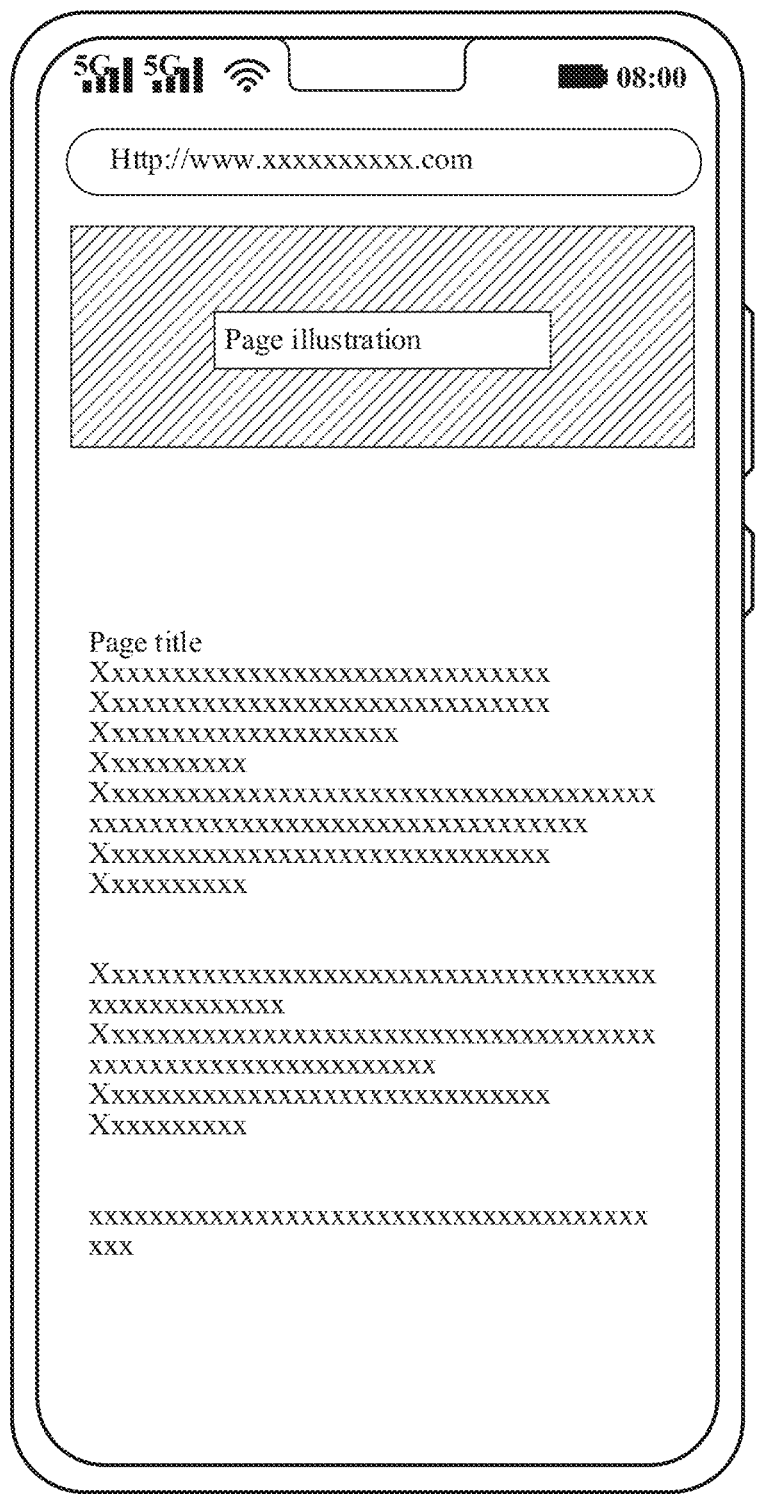
Figure 4C:
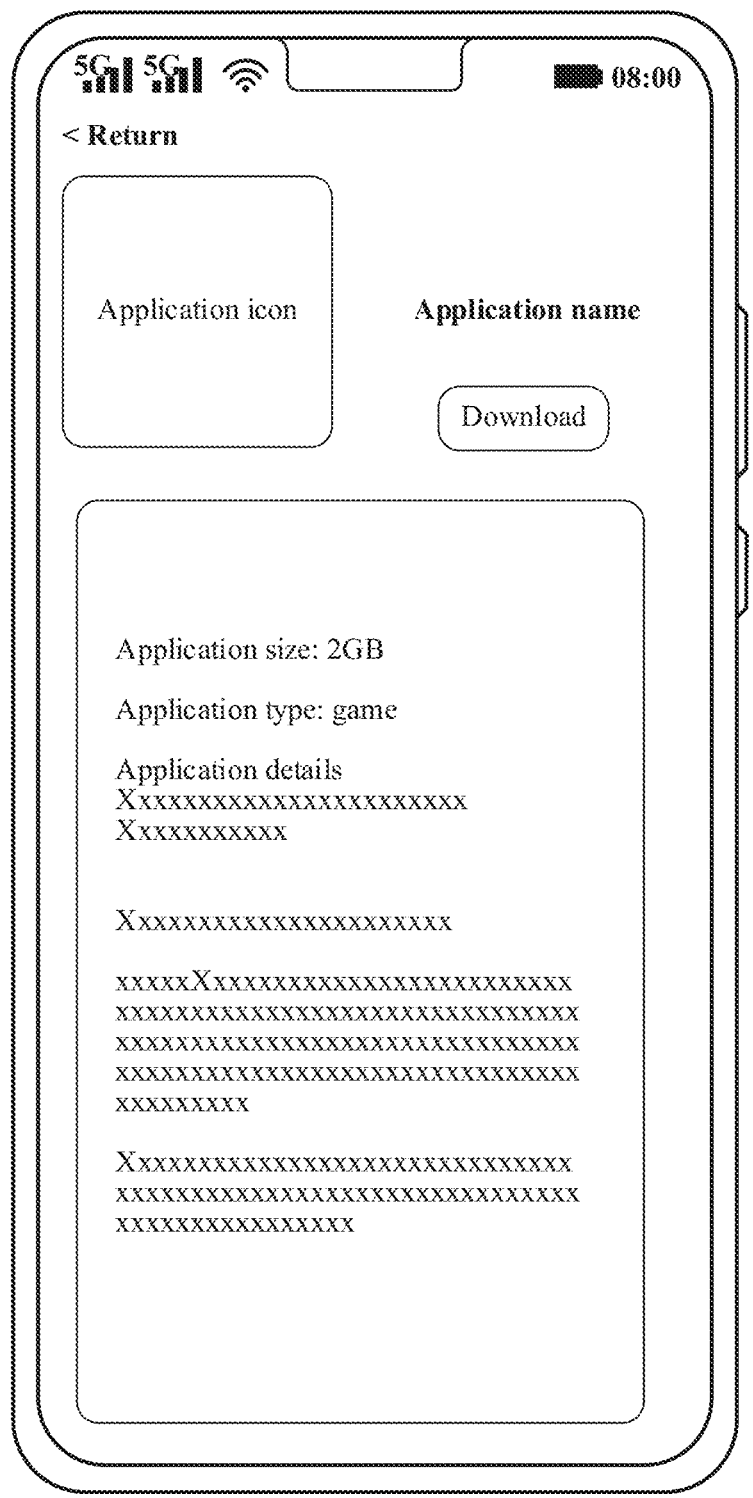
Figure 4D:
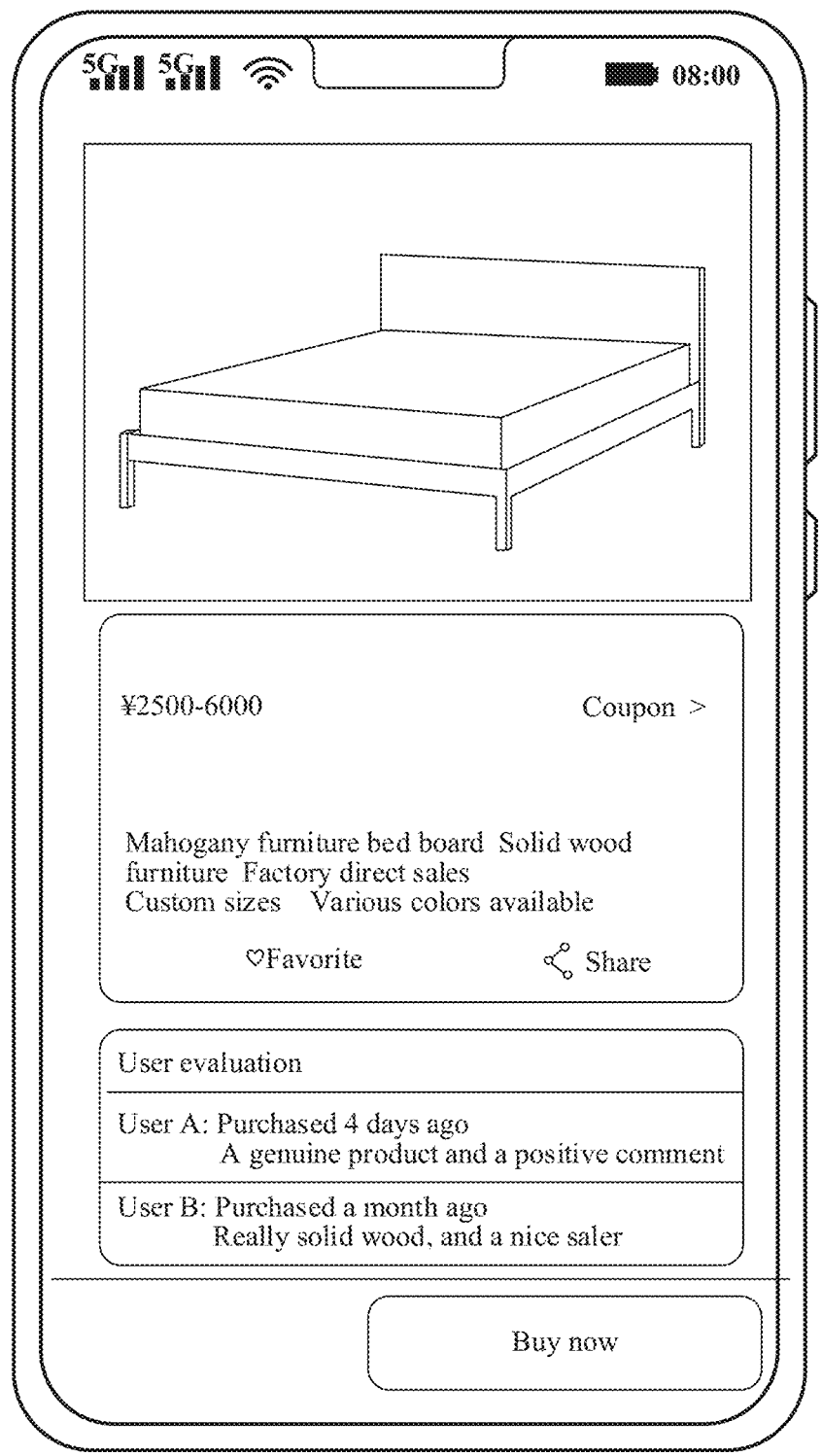

In a conventional technology, various types of application programs are generally relied on as carriers for information promotion. For example. FIG. 4(a), FIG. 4(b), FIG. 4(c), and FIG. 4(d) are schematic diagrams of information promotion based on an existing video application program. As shown in FIG. 4(a), a video playback control 401 is configured in the video application program, and a video file such as a TV series, a movie, or an animation may be played through the video playback control 401. If a preset information promotion condition is met, for example, playback duration reaches a preset duration threshold, or if it is detected that a user clicks a pause button, a pop-up window 402 used for promoting information may be displayed in the video application program. Because a display area of the pop-up window 402 is limited, a part of content of information that needs to be promoted is usually displayed in a manner such as a combination of a content abstract, a title, and a subtitle. If the user is interested in the information or needs to perform subsequent operations, an associated page may be jumped to. Because an application program that is running in a foreground of an electronic device is a video application program, and the video file is being played in the video application program, if the associated page is jumped to, the electronic device needs to switch the video application program from running in the foreground to running in a background, and then display a page associated with the information. The page associated with the information may determine, based on information content, an application program that needs to be activated. If the information type is a network page type, a browser application may be activated to run in the foreground, and the page associated with the information is displayed through the browser application, as shown in FIG. 4(b). If the information type is an application download type, an application mall program may be activated, and a corresponding download page is displayed through the application mall program, as shown in FIG. 4(*c*). If the information type is a commodity type, a shopping application program may be activated to run in the foreground, and a purchase page of an associated commodity is displayed through the shopping application program, as shown in FIG. 4(*d*). Regardless of the type of information, when a page associated with the information is displayed through a corresponding application program, the video application program needs to be switched to run in the background, and after content of the information is browsed or a corresponding operation is performed, the video application program needs to be manually switched from running in the background to running in the foreground. The original video file may be played continuously. To be specific, if the user needs to learn detailed content of the information, the user needs to switch back and forth between the video application program and an application program associated with the promotion information.

Figure 5:
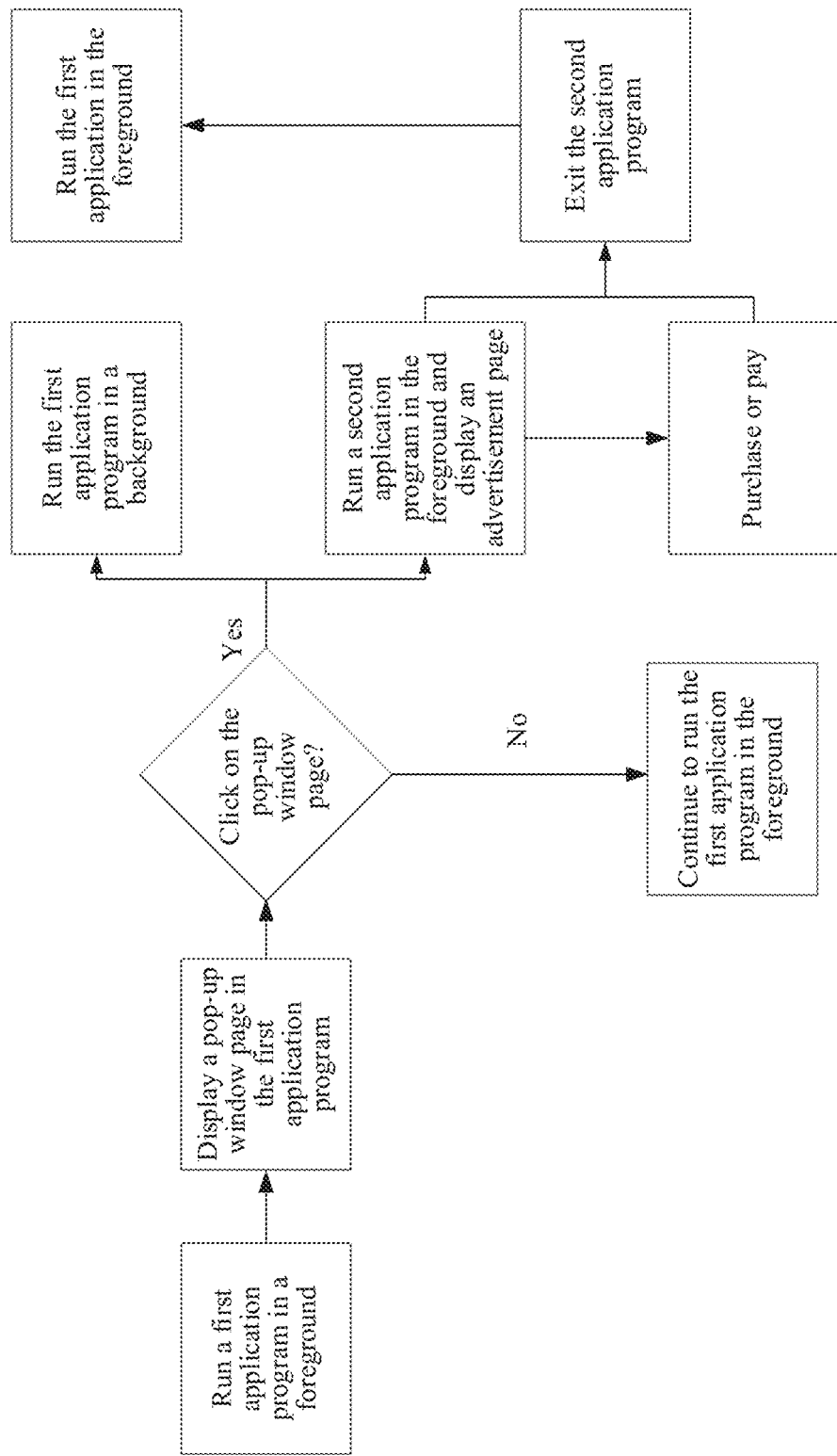
FIG. 5 is a schematic flowchart of an existing page display technology.

For example, FIG. 5 is a schematic flowchart of an existing page display technology. Referring to FIG. 5, a process in which an electronic device displays a page of information that needs to be promoted is as follows.

Step 1. An application program, for example, a first application program, runs in a foreground of an electronic device.

Step 2. The electronic device may display, in a form of a pop-up window in the first application program, content that needs to be promoted, for example, advertisement information, to be specific, display, in the first application program, a pop-up window page that includes the advertisement information.

Step 3. If detecting that a user clicks the pop-up window page, the electronic device determines that the user needs to learn detailed content of the information, to be specific, identifies that the user initiates a display operation on the pop-up window page, and the electronic device switches the first application program currently running in the foreground to run in a background.

Step 4. After switching the first application program to run in the background, the electronic device may activate a second application program used to display the detailed content of the information, and open the detailed content of the information in the second application program, to be specific, display an advertisement page. If the user finishes browsing the advertisement page, the network page may be closed, and step 6 is jumped to.

Step 5. If the advertisement page is a product purchase page, the user may further perform a purchase operation on the product purchase page. After the purchase is completed, step 6 may be automatically jumped to, the user may manually close the advertisement page and step 6 is jumped to.

Step 6. After receiving a close operation for the advertisement page initiated by the user, the electronic device may close the advertisement page, and exit the second application program used to display the advertisement page.

Step 7. After exiting the second application program, the electronic device may invoke the first application program running in the background, and switch the first application program to run in the foreground. Alternatively, after exiting the second application program, the electronic device may display a home interface of the electronic device, receive a clicking operation performed by the user on an application icon of the first application program, and in this case, switch the first application program from running in the background to running in the foreground.

Step 8. If the electronic device does not collect a click operation of clicking the pop-up window page by the user and display duration of the pop-up window page exceeds a preset duration threshold, or the electronic device collects a close operation on the pop-up window page by the user, the electronic device may automatically close the pop-up window page, and keep the first application program running in the foreground.

It may be learned that in the existing page display technology, the electronic device may display, in some areas of a running application program, the information that needs to be promoted. If the user needs to learn detailed content of the promotion information, the electronic device needs to switch the running application program to run in the background. A page on which the promotion information is displayed through another application program affects continuity of running of the originally running application program. If the application program is a video application, a game application, or the like, use experience of the user is affected. In addition, after an operation on a promotion page is completed, the application program that is originally running needs to be manually switched. Operations are cumbersome, and operation efficiency of the application program is reduced.

Embodiment 1

To resolve a disadvantage of an existing page display technology, this application provides a page display method, to resolve a problem that continuity of use of a running application program is affected w % ben detailed content of push information needs to be learned, and operation efficiency of the application program is low due to cumbersome operation steps of the application program caused because a user frequently performs application program switching.

Figure 6:
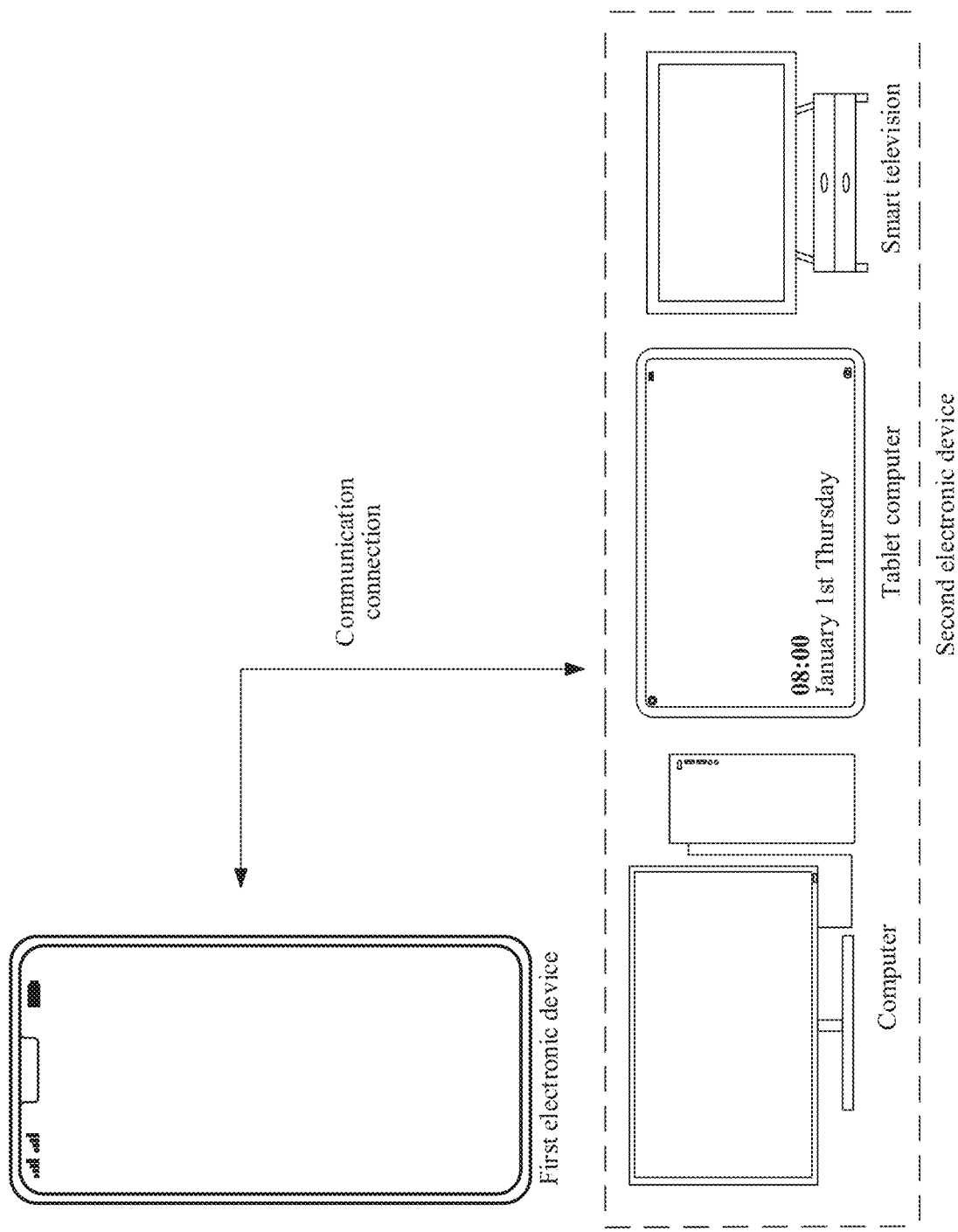
FIG. 6 is a schematic diagram of a connection between a first electronic device and a second electronic device according to an embodiment of this application.

The page display method provided in this embodiment is mainly implemented through two electronic devices. For ease of distinguishing the two electronic devices, the two electronic devices are respectively referred to as a first electronic device and a second electronic device. The first electronic device and the second electronic device may be two electronic devices of a same model, or may be electronic devices of different models. "First" and "second" are merely used to distinguish two different electronic devices, and are not intended to limit whether a function and a model of the electronic devices are the same. For example, FIG. 6 is a schematic diagram of a connection between a first electronic device and a second electronic device according to an embodiment of this application. Referring to FIG. 6, an electronic device configured to display some content of information that needs to be pushed is referred to as the first electronic device. For example, the first electronic device may be configured to display a pop-up window of the information that needs to be pushed. The first electronic device in FIG. 6 may be a smartphone. An electronic device configured to display all content of the information that needs to be pushed is referred to as the second electronic device. For example, the second electronic device may be configured to display a complete page of the information that needs to be pushed. The second electronic device in FIG. 6 may be a computer. It should be noted that in addition to being a computer, the second electronic device may further be another electronic device such as a tablet computer, a notebook computer, or a smart television. A communication connection is established between the first electronic device and the second electronic device. The communication connection may be a wireless communication connection or a wired communication connection. The wireless communication connection includes: a Bluetooth communication connection, a near field communication connection, a wireless local area network Wi-Fi communication connection, a communication connection established based on a mobile data network, and the like; and the wired communication connection includes: a serial port communication connection and an Ethernet port communication connection. The first electronic device and the second electronic device may exchange data through the established communication connection, for example, transmit a display instruction through the communication connection. It should be noted that the first electronic device and the second electronic device are only configured to distinguish between an electronic device configured to display some content of the promotion information and an electronic device configured to display all content of the promotion information. In another embodiment, the second electronic device may also display a first page that includes some content of the promotion information, and the first electronic device may also display a second page that includes all content of the promotion information.

Figure 7:
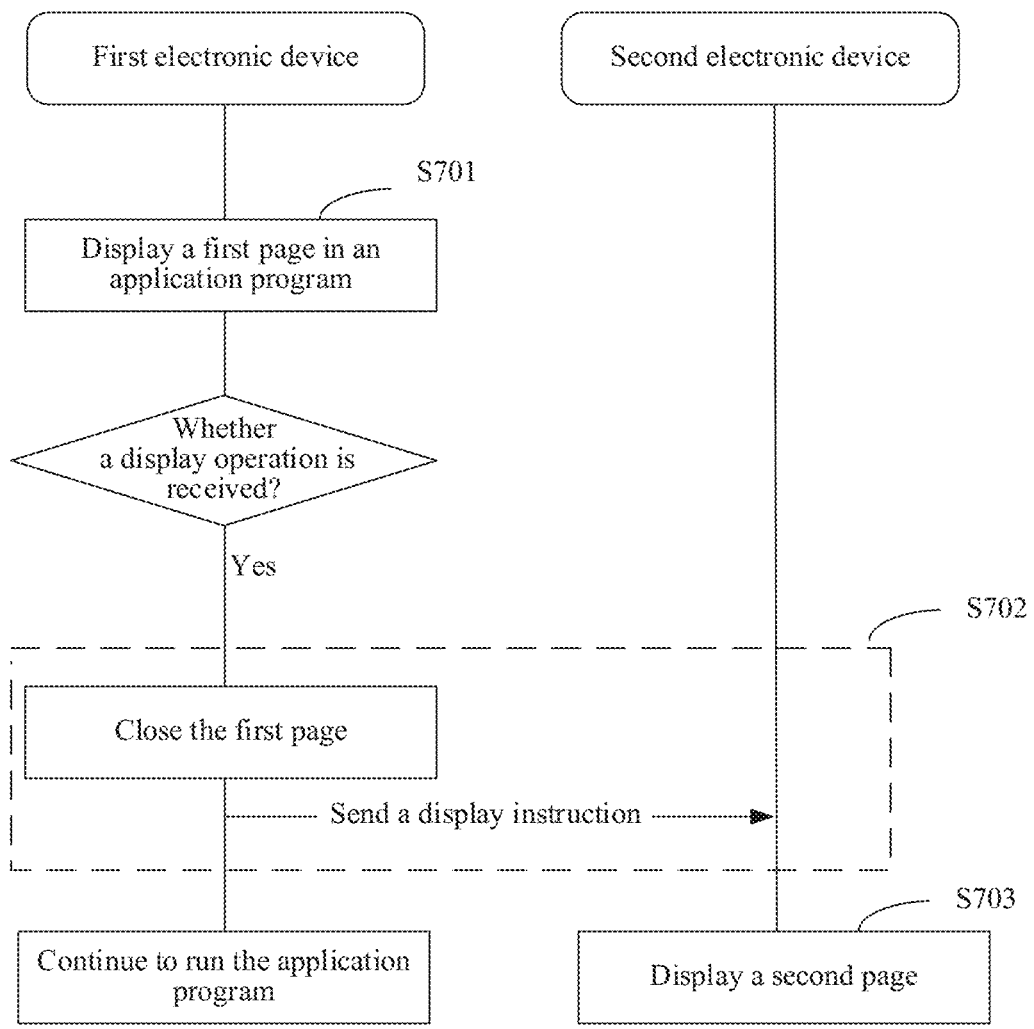
FIG. 7 is a flowchart of an implementation of a page display method according to an embodiment of this application.

FIG. 7 is a flowchart of an implementation of a page display method according to an embodiment of this application. Details are as follows.

In S701, a first electronic device displays a first page in a running application program.

Figure 8A:
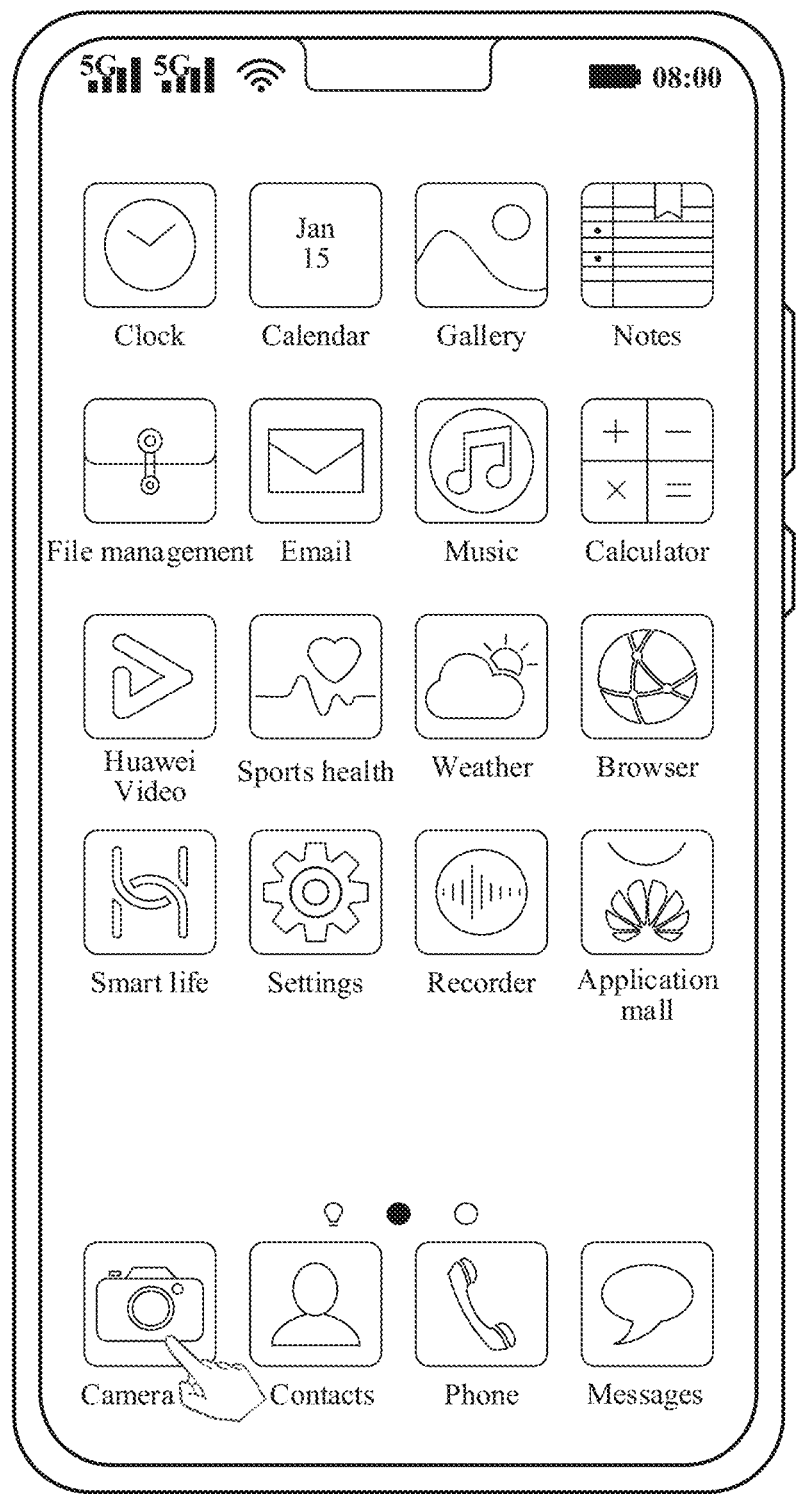
FIG. 8(a), FIG. 8(b), FIG. 8(c), and FIG. 8(d) are diagrams of a running interface of an application program according to an embodiment of this application.
Figure 8B:
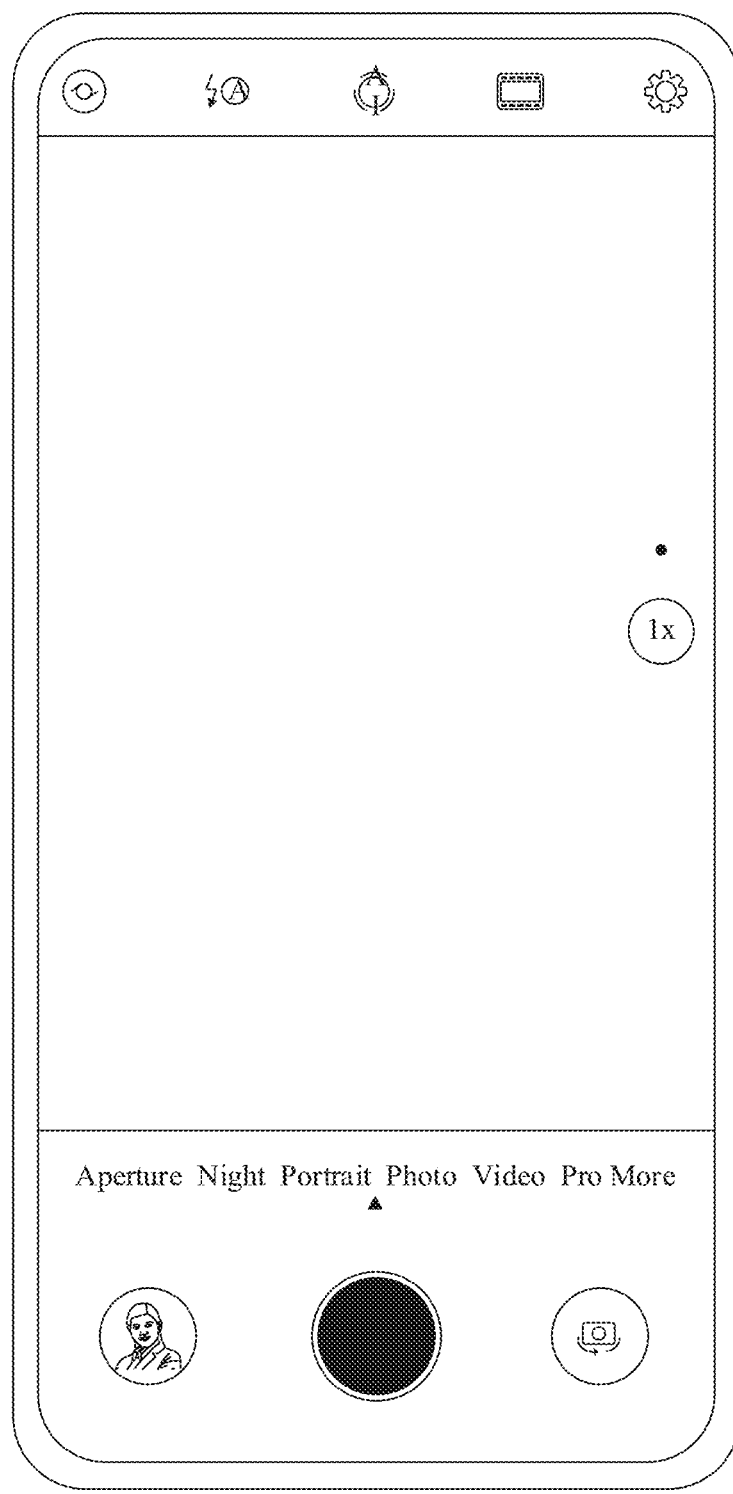

In this embodiment, at least one application program may be installed on the first electronic device. For example, in a process of using the first electronic device, FIG. 8(a), FIG. 8(b), FIG. 8(c), and FIG. 8(d) are diagrams of a running interface of an application program according to an embodiment of this application. Referring to FIG. 8(a), a plurality of application programs may be installed in the first electronic device, an application icon of each application program may be displayed on a home interface of the first electronic device, and a user may click any application icon displayed on the home interface of the first electronic device, to start an application program corresponding to the application icon. The first electronic device may, in response to a clicking operation initiated by the user on the application icon, start the application program, and run the application program in a foreground of the first electronic device, as shown in FIG. 8(b).

In this embodiment, the application program in the first electronic device may be in at least two running states, and the two running states include but are not limited to: a foreground running state and a background running state. The foreground running state is specifically a running state on a desktop of the first electronic device, to be specific, an application program in the foreground running state is displayed on a display interface of the first electronic device, and an application interface of the application program is in a visible state. As shown in FIG. 8(b), the application interface of the application program is displayed on the desktop of the first electronic device, to be specific, displayed on a display module of the first electronic device. The background running state is specifically a state that is not running on the desktop of the first electronic device, to be specific, an application program in the background running state is not displayed on the display interface of the first electronic device, to be specific, in the invisible state.

Figure 8C:
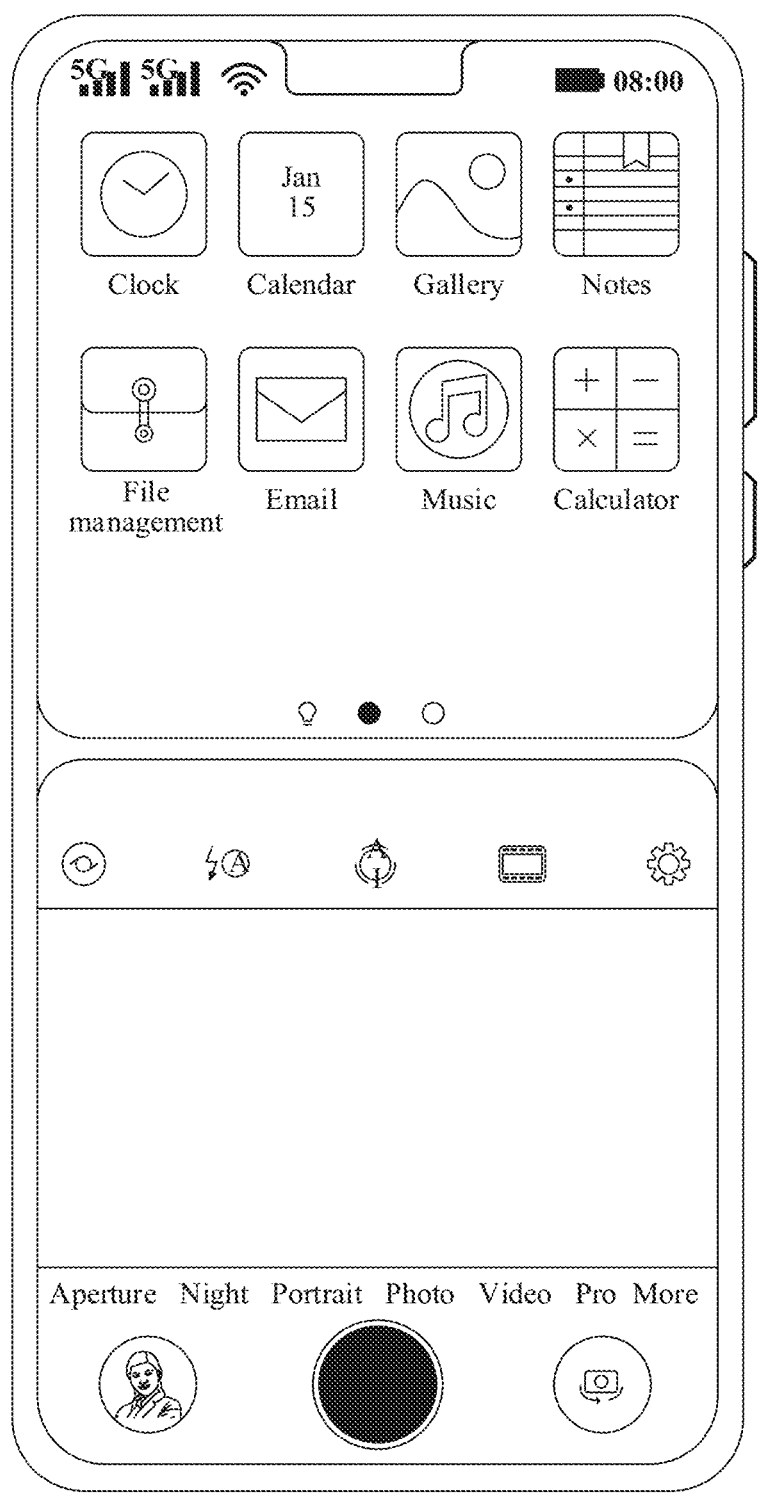
Figure 8D:
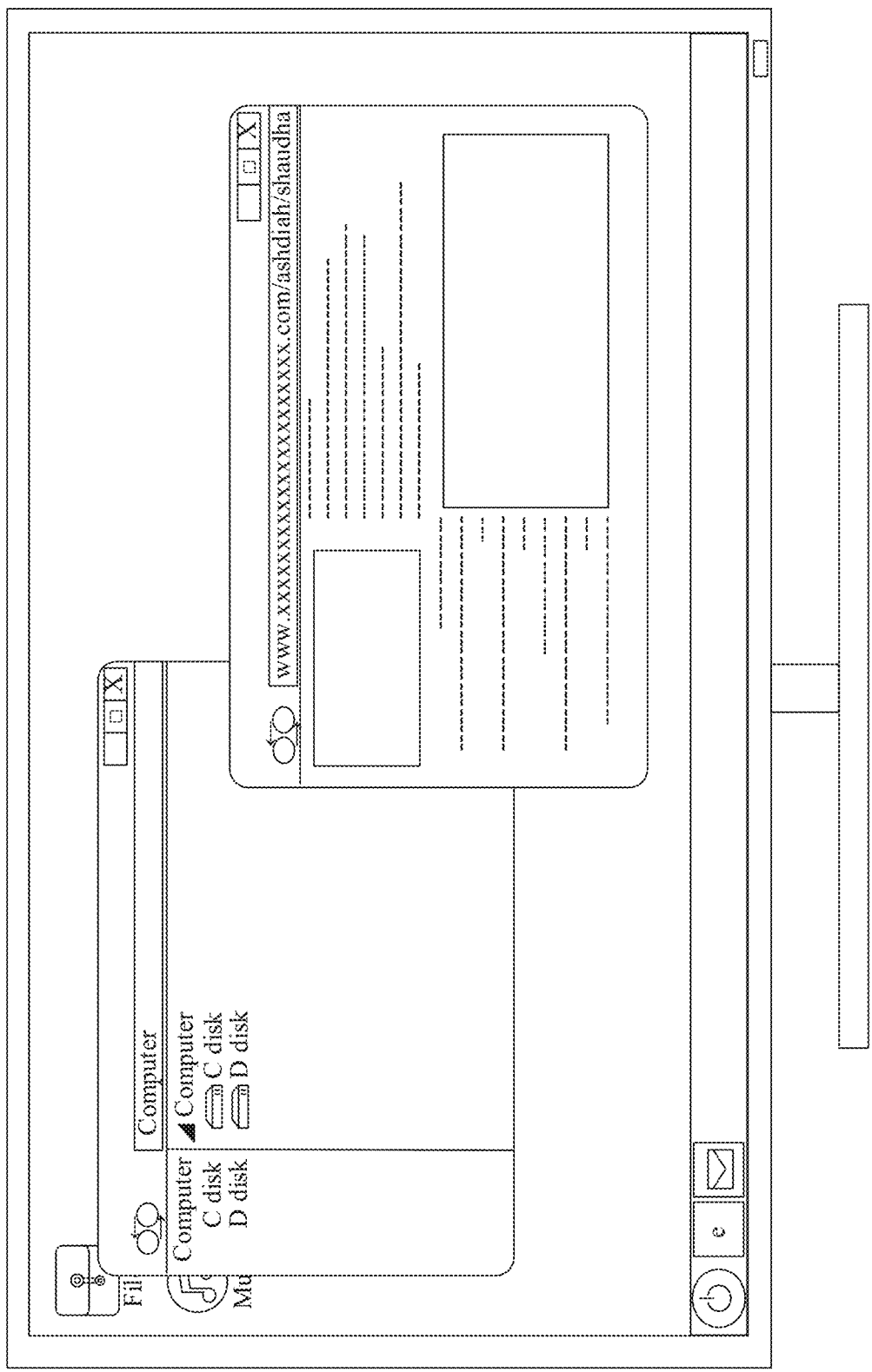

For example, for a smartphone, generally, a quantity of application programs running in the foreground is one. If a smartphone supports a split-screen function, to be specific, a screen may be divided into a plurality of areas, there may be a plurality of application programs running in the foreground of the smartphone. A quantity of application programs running in the foreground is consistent with a quantity of areas divided by the screen. For example, if the smartphone supports the split-screen function, and a quantity of split-screen areas is two, the screen may be divided into two areas, and different application programs are respectively and simultaneously run in the two areas. As shown in FIG. 8(c), both the two application programs are in the foreground running state, and several application programs may run in the background of the smartphone. For an electronic device such as a computer or a notebook computer, a quantity of application programs running in the foreground may be more than one. For example, the computer may simultaneously start a file editing program and a picture browsing program, and the two application programs may be simultaneously displayed on a display interface of the computer, as shown in FIG. 8(d). However, an operation interface corresponding to a background application program, such as an audio management program and a network management program, may not be displayed on the display interface.

Figure 9:
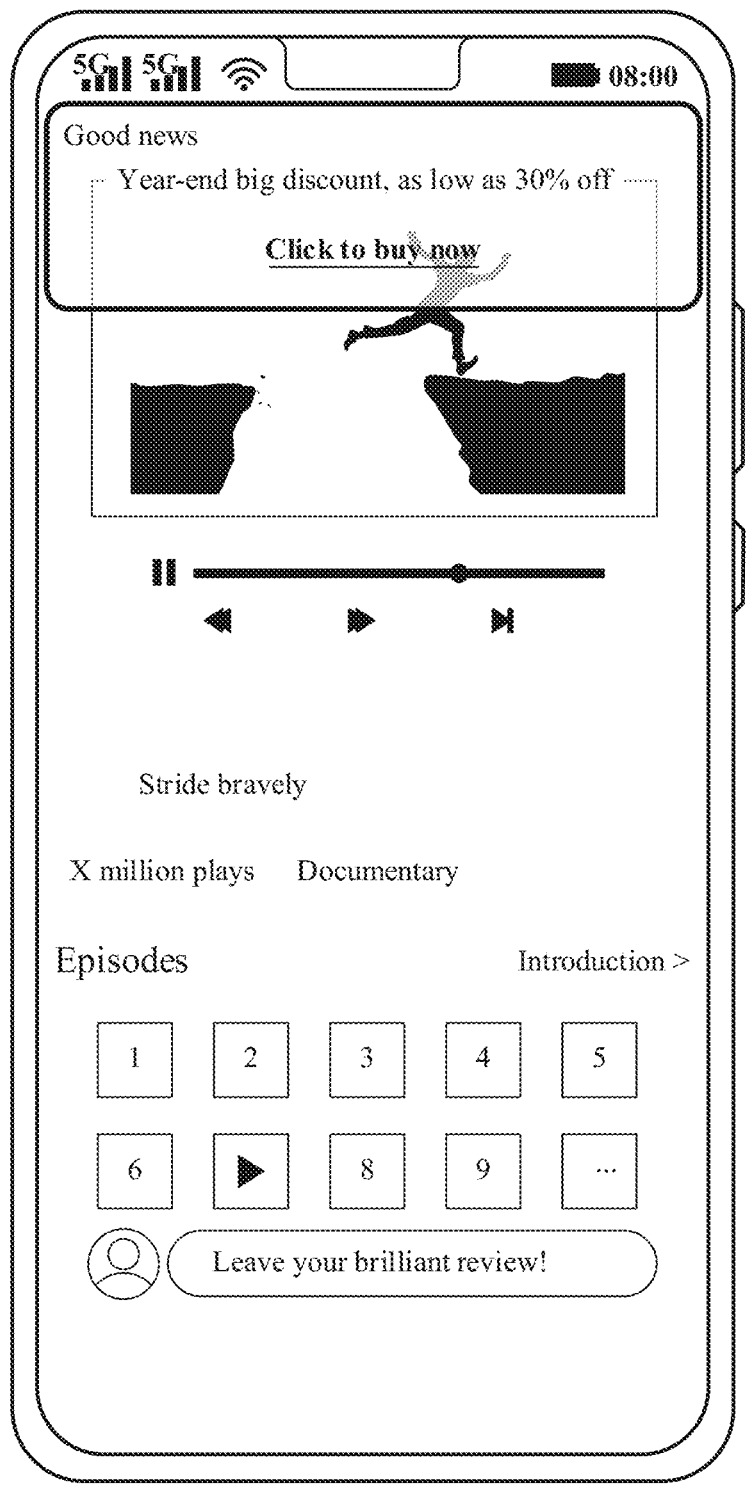
FIG. 9 is a schematic diagram of display of a first page according to an embodiment of this application.

In this embodiment, the running application program is the application program in the foreground running state on the first electronic device. The running application program may be an application program of any type, such as a video playback application program, an image editing application program, a browser application program, and an online shopping application program. The electronic device may display a first page in the running application program, where the first page may be a pop-up window page generated in the application program, for example, the pop-up window 402 in FIG. 4(a), or may be a promotion information display area in a program interface of the application program, for example, FIG. 3(a). For example, FIG. 9 is a schematic diagram of display of a first page according to an embodiment of this application. Referring to FIG. 9, the first page may alternatively be an information prompt box, and the first page is displayed on a running application program in a notification manner.

In a possible implementation, the first page may be used to display information that needs to be promoted, for example, an advertisement, subscribed information, received chat information, and recommendation information.

In a possible implementation, the first page is specifically used to jump to another page different from a currently displayed page, namely, a second page. In other words, the first page includes information that may be displayed and needs to be promoted, and the first page is further associated with a jump link. The jump link is associated with the second page.

In a possible implementation, the first page may include any one or a combination of a plurality of types of information, such as a text, a picture, a video, or audio.

In a possible implementation, content of the first page may be dynamically switched in a display process. For example, each piece of display content on the first page is associated with corresponding display duration, and display duration of each piece of display content may be the same or may be different. The first page may sequentially display each piece of display content based on a preset display order. After detecting that actual display duration of a piece of display content is greater than or equal to preset display duration, the first page switches to display content in a next display order, and the reset can be deduced by analogy. It should be noted that a jump link corresponding to each piece of display content may be different or may be the same. This is not limited herein.

In a possible implementation, the first page may be simultaneously displayed when the application interface of the application program is generated, to be specific, the first page may be embedded in the application interface of the application program. In this case, the first page occupies some areas of the application interface, as shown in FIG. 3(a), the first page is a promotion information display area preconfigured in the application interface.

In a possible implementation, a corresponding display trigger condition is configured for the first page. The display trigger condition may be a time trigger condition. For example, the time trigger condition may be determined based on operation duration of the application program, or a preset display period may be configured, and the first page is displayed in the application program in the preset display period; and alternatively, the display trigger condition may be an event trigger condition. A plurality of trigger events may be preconfigured for the application program, for example, it is detected that the user clicks a control in the application program, or switches to a page of the application program. After starting the application program, the first electronic device may monitor whether any associated display trigger condition is met, and if detecting that the preset display trigger condition is met, display the first page in the application program.

In a possible implementation, the first electronic device may be connected to the internet through a wireless communication module, a wired communication module, or the like. The first electronic device may download display content of the first page from the internet. It should be noted that the first page may be associated with a corresponding cloud server. Before displaying the first page, the first electronic device may download, from the cloud server associated with the first page, display content that needs to be displayed, and when displaying the first page, display the corresponding display content on the first page.

In a possible implementation, if the first electronic device is in an offline state, to be specific, the first electronic device cannot download the display content that needs to be displayed from the cloud server associated with the first page, the downloaded display content may be obtained from a cache area associated with the first page, and the downloaded display content is displayed on the first page.

Figure 10:
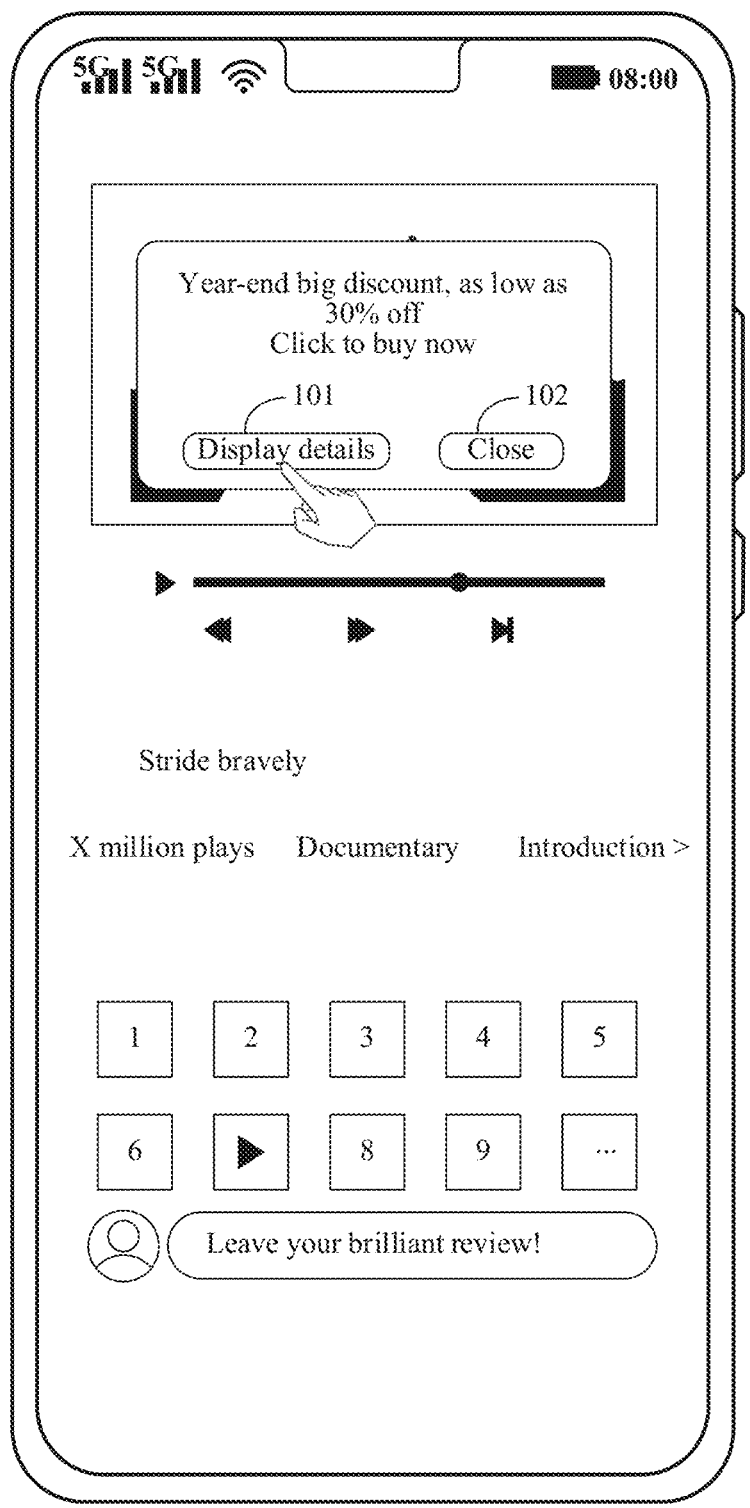
FIG. 10 is a schematic diagram of a first page according to an embodiment of this application.

In a possible implementation, the first page includes a display control and a close control. For example, FIG. 10 is a schematic diagram of a first page according to an embodiment of this application. As shown in FIG. 10, the first page includes a display control 101 and a "Close" control 102. If detecting that a user clicks the display control 101, the first electronic device identifies that the user initiates a display operation, and performs S702; and if detecting that the user clicks the "Close" control 102, the first electronic device identifies that the user needs to close the first page, and closes the first page. Characters displayed in the display control 101 may be other characters, such as "display details" and "view content", and are used to prompt the user that the display control 101 is used to display all content of information that needs to be promoted.

In a possible implementation, the first page may not include a display control. In other words, the first electronic device identifies that the user initiates a display operation on the first page only if detecting that the user performs a corresponding operation (such as clicking, double-clicking, or pressing) on the first page, and performs a related operation in S702.

In S702, the first electronic device closes the first page in response to a display operation initiated by a user on the first page, and sends a display instruction related to the first page to a second electronic device.

In this embodiment, the first electronic device may obtain, through an interaction module, a display operation initiated by the user on the first page. The interaction module may be a touch module, a mouse, a keyboard, or the like. The interaction module may obtain an operation initiated by the user on the first electronic device, and if it is detected that the operation initiated by the user is the display operation on the first page, step S702 is performed.

In this embodiment, the first electronic device may display, through the second electronic device, a second page of all content of information that needs to be promoted, and the first electronic device may continue to run an originally running application program. This maintains continuity of running of the application program Based on this, after sending the display instruction to the second electronic device, the first electronic device may close the displayed first page, and continue to run the originally running application program. Certainly, after receiving a display completion instruction fed back by the second electronic device, the first electronic device may further close the displayed first page, and continue to run the originally running application program.

Figure 11A:
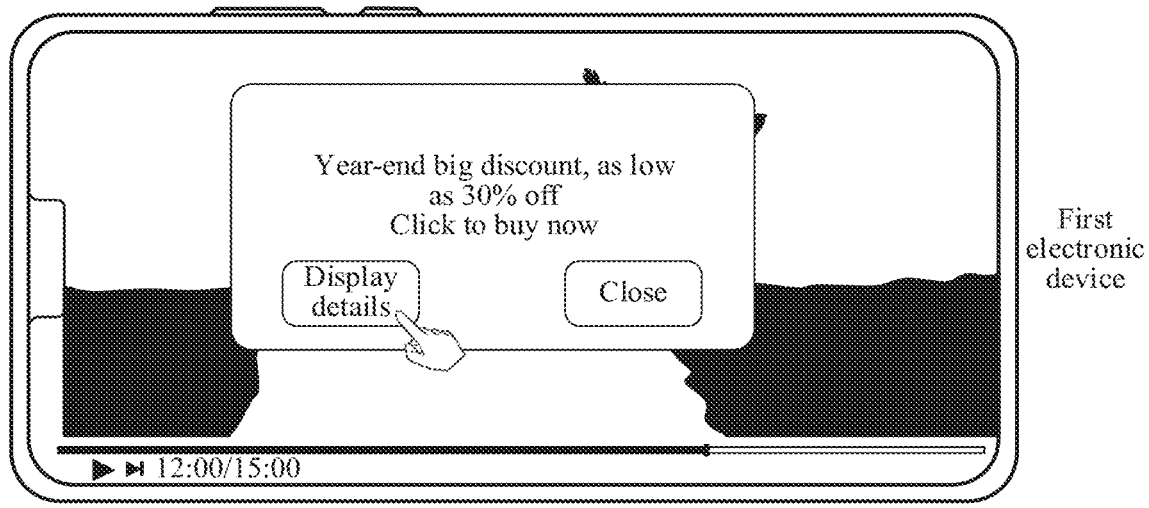
FIG. 11(a) and FIG. 11(b) are schematic diagrams of a response to a display operation according to an embodiment of this application.
Figure 11B:
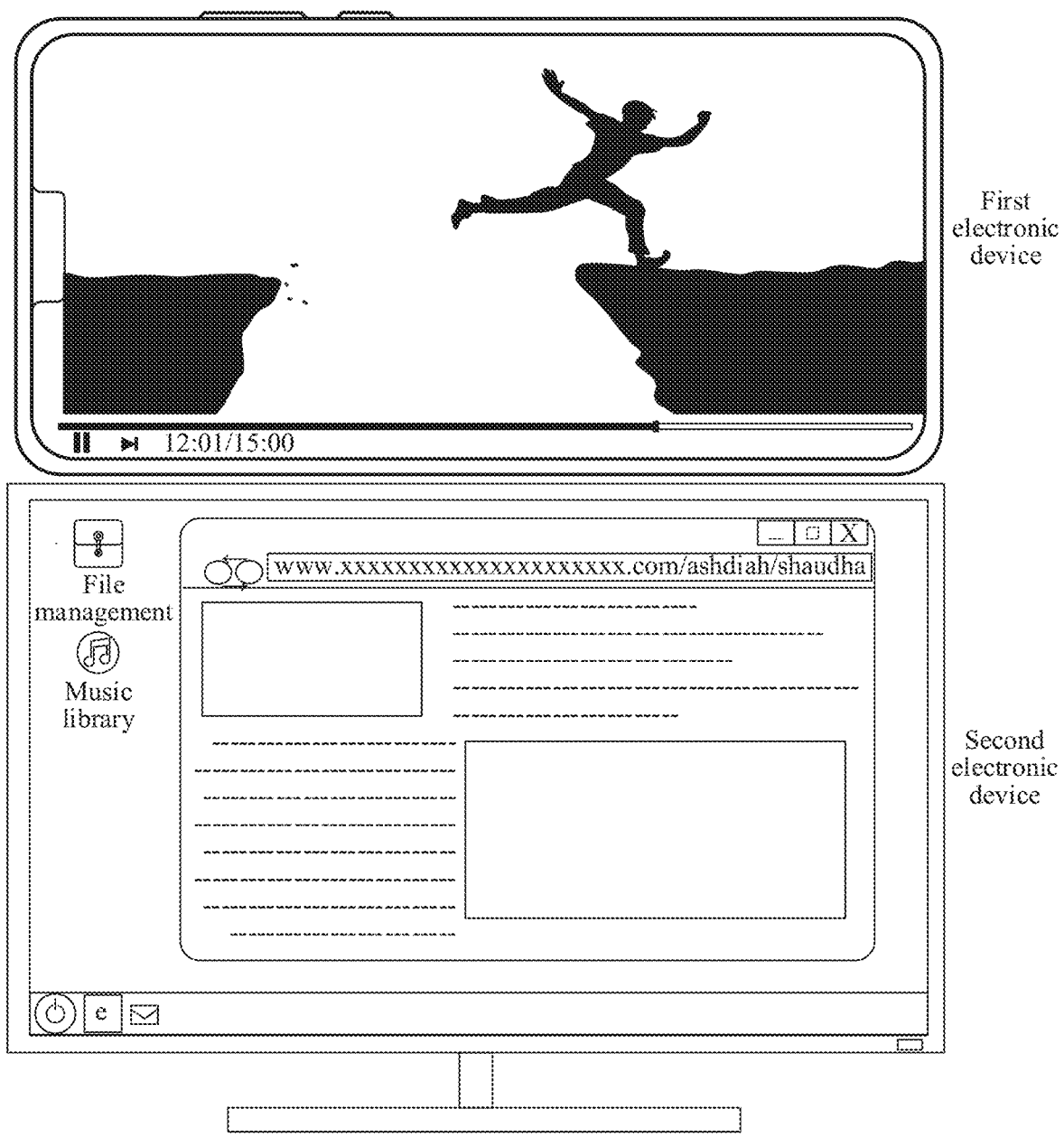

In a possible implementation, if the first page is displayed through a pop-up window page, the first electronic device may close the pop-up window page. Because a display layer of the pop-up window page is higher than a display layer of an application interface of the application program, to be specific, from a display effect perspective, the pop-up window page covers some areas of the original application interface. In this case, after the first electronic device closes the first page, the application interface originally covered by the first page is displayed again. Optionally, if the first electronic device pauses a running process in the application program when displaying the first page, the first electronic device may resume running of the process. For example, FIG. 11(a) and FIG. 11(b) are schematic diagrams of a response to a display operation according to an embodiment of this application. Referring to FIG. 11(a), an application program originally run by a first electronic device is a video playback application. The video playback application is playing a video file before a first page is displayed. When the first page is displayed, the first electronic device may pause the video file being played, to be specific, pause a video playback process. Still referring to FIG. 11(b), in response to the display operation that is related to the first page and that is initiated by a user, the first electronic device closes the first page, namely, a pop-up window page, and continues to resume running of the video playback process, to be specific, continues to play the video file. Other types of application programs may respond in a manner similar to that of the video playback application program.

In a possible implementation, if the first page is displayed in a message notification manner, the first electronic device may close the message notification. A manner of closing the message notification may be implemented by cutting up a picture, cutting out a picture to the left, or the like.

In this embodiment, a communication connection is established between the first electronic device and a second electronic device. Data exchange between the two devices may be implemented through the communication connection. The first electronic device may send the display instruction to the second electronic device through the communication connection.

In a possible implementation, the display instruction specifically indicates the second electronic device to display a second page associated with the first page. In this case, the display instruction may carry a jump link associated with the first page, so that after the second electronic device receives the jump link, and the second page associated with the first page may be generated.

In a possible implementation, the first electronic device may store a communication address of the second electronic device. When the generated display instruction needs to be sent to the second electronic device, the communication address of the second electronic device may be encapsulated into a packet header of a data packet of the display instruction. In this way, the network device may perform addressing based on the packet header of the data packet, and send the data packet including the display instruction to the second electronic device.

In a possible implementation, the first electronic device and the second electronic device may access a same local area network. The local area network may be a wireless local area network based on a Wi-Fi network, or may be a one-to-one local area network established based on a Bluetooth module. The first electronic device may send the display instruction to the second electronic device through the established local area network.

In a possible implementation, both the first electronic device and the second electronic device are electronic devices loaded with a Harmony system, the first electronic device and the second electronic device may have a collaboration function, and both the collaboration function of the first electronic device and the collaboration function of the second electronic device are in an enabled state. In this case, the first electronic device may establish a communication link with the second electronic device through a wireless communication module (for example, a Wi-Fi module, a Bluetooth module, a Bluetooth low energy module, or a near field NFC communication module) based on a communication protocol corresponding to the collaboration function, and send the display instruction through the communication link.

In a possible implementation, a user account of the user may be logged in to on a device system of the first electronic device. When logging in to the user account on the first electronic device, the user needs to input an account identifier associated with the user account (for example, an account name, an account number, an associated mobile number, or the like) and account information such as an account password. The first electronic device uploads received account information of a user account to the cloud server, and performs authentication on the user information through the cloud server. If the authentication succeeds, the cloud server sends a piece of login success information to the first electronic device. To be specific, an associated user of the first electronic device is the user account. Similarly, the second electronic device may also log in to the user account in the foregoing manner.

Optionally, when sending the display instruction to the second electronic device, the first electronic device may add authentication information of the user account to a data packet corresponding to the display instruction, and the second electronic device may match the authentication information carried in the data packet with authentication information of the locally logged-in user account. It is determined whether the first electronic device and the second electronic device log in to a same user account, and if yes, an operation of S703 is performed; and on the contrary, if the two electronic devices log in to different user accounts, the display instruction is refused to be responded to. Optionally, the second electronic device sends one piece of authentication failure information to the first electronic device.

Optionally, before sending the display instruction to the second electronic device, the first electronic device may generate a candidate device list. The candidate device list includes another electronic device that logs in to a same user account as the first electronic device, and receives a selection instruction initiated by the user based on the candidate device list. The candidate device list identifies another electronic device corresponding to the selection instruction as the second electronic device, and sends the display instruction to the second electronic device.

Figure 12:
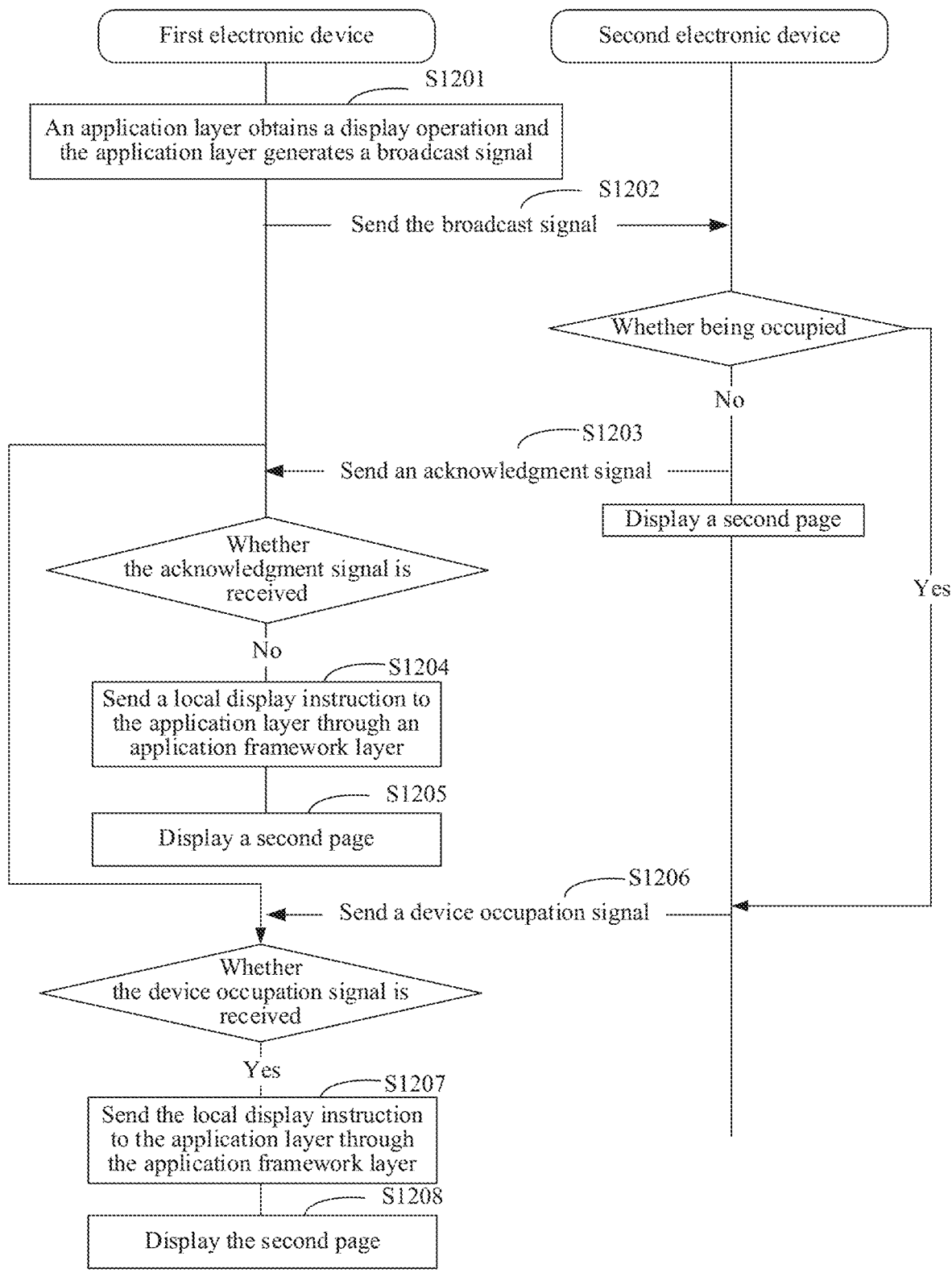
FIG. 12 is a flowchart of a specific implementation of S702 in a page display method according to an embodiment of this application.

Further, in another embodiment of this application, FIG. 12 is a flowchart of a specific implementation of S702 according to an embodiment of this application. Referring to FIG. 12, compared with the foregoing embodiment, S702 in embodiments of this application specifically includes S1201 to S1208. Detailed descriptions are as follows.

In S1201, the first electronic device obtains, through an application layer, the display operation initiated by the user in the application program, and generates, through the application layer, a broadcast signal carrying the display instruction.

In this embodiment, a software structure framework of the first electronic device may be divided into at least four layers: an application layer (namely, an application program layer), an application framework layer (namely, an application software framework layer), a runtime, a system library, and a kernel layer. Various types of application programs run by the first electronic device may run at the application layer. Therefore, the first electronic device may obtain various types of operations of the user in the application program through the application layer. When obtaining, through the application layer, an operation initiated by the user in the application program, the first electronic device may receive, through an interface provided by the application framework layer, data fed back by each data collection module, for example, a touch sensor, a photosensitive sensor, and a motion sensor. Based on the data fed back by each data collection module, the first electronic device determines an operation initiated by the user, and if detecting that the operation initiated by the user is the display operation, the first electronic device generates, through the application layer, a broadcast signal carrying a display instruction.

In this embodiment, for a type of the display operation, refer to related description of S701, for example, clicking or double-clicking the first page. Details are not described herein again.

In this embodiment, after obtaining a display operation of the first page through the application layer, the first electronic device needs to display a second page associated with the first page. In this case, the first electronic device may generate, through the application layer, a display instruction corresponding to the first page, and the display instruction may carry a jump link associated with the first page. The first electronic device may further encapsulate the display instruction through the application layer, to obtain a broadcast signal including the display instruction.

In a possible implementation, after generating the broadcast signal through the application layer, the first electronic device may activate, through a core layer, a hardware module, such as a Bluetooth communication module or a Wi-Fi communication module, configured to send the broadcast signal, and modulate the broadcast signal from a digital signal into an electrical signal through the hardware module, and send the electrical signal to the second electronic device.

Optionally, after receiving, through the application layer, a display operation initiated by the user, the first electronic device may generate a corresponding device selection page. The device selection page is used to display a candidate electronic device that may display a second page associated with the first page. The first electronic device may also obtain, through the application layer, a selection operation initiated by the user, determine the second electronic device based on the selection operation, and generate the broadcast signal based on the display instruction and information (such as a device identifier or a communication address) that identifies an identity of the second electronic device, so that the second electronic device may receive the broadcast signal.

Figure 13:
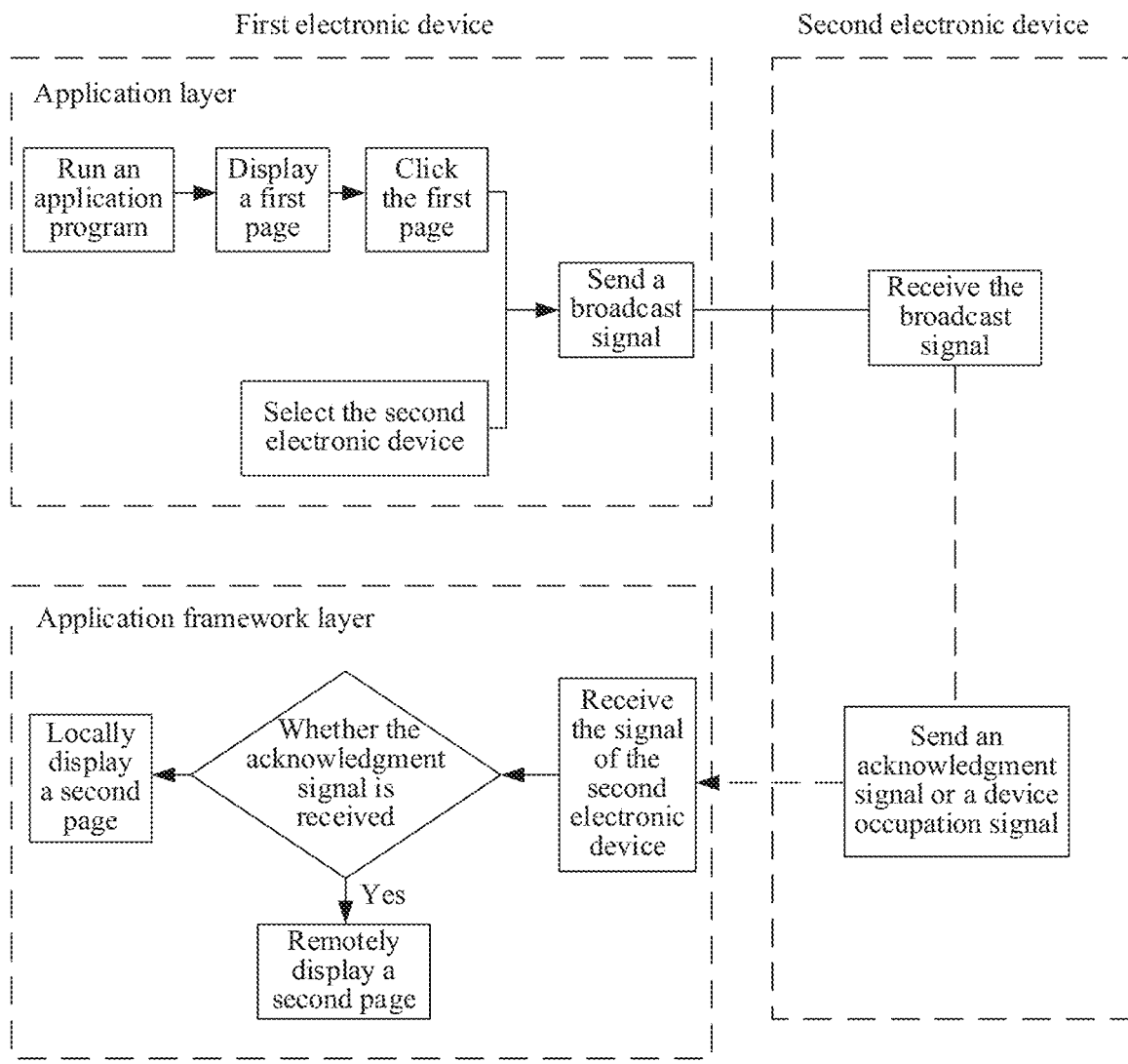
FIG. 13 is a schematic flowchart of software frameworks of a first electronic device in a process of executing a page display method provided in this embodiment.

For example, FIG. 13 is a schematic flowchart of software frameworks of a first electronic device in a process of performing a page display method provided in this embodiment. Referring to FIG. 13, the first electronic device runs an application program at an application layer. When running the application program at the application layer, if detecting that a preset display trigger condition is met, the first electronic device may display a first page in the application program running at the application layer, and monitor whether a user initiates a display operation on a first page, for example, whether to click the first page. If detecting that the user clicks the first page, the first electronic device may directly generate a broadcast signal that carries a display instruction, or may generate a corresponding device selection control in a currently running application program through the application layer, receive a selection operation initiated by the user, determine the second electronic device, and generate a broadcast signal based on identification information of the second electronic device and the display instruction.

In S1202, the first electronic device sends the broadcast signal to the second electronic device.

In this embodiment, after generating a broadcast signal including the display instruction, the first electronic device may invoke a corresponding communication module to send the broadcast signal. Optionally, a communication link may be established between the first electronic device and the second electronic device in advance. In this case, the first electronic device may send the broadcast signal through the communication link. Optionally, the broadcast signal may carry a device identifier of the second electronic device, and the broadcast signal is sent in a broadcast sending manner. To be specific, each electronic device in a communication range of the first electronic device may receive the broadcast signal. After receiving the broadcast signal, the electronic device in the communication range may match the device identifier in the broadcast signal with a local device identifier, and determine whether to respond to the broadcast signal based on the matching result. Based on this, because the broadcast signal carries the device identifier of the second electronic device, after receiving the broadcast signal, the second electronic device obtains a matching result that the device identifier of the broadcast signal matches the local device identifier, and performs an operation of S1203.

In S1203, the second electronic device sends an acknowledgment signal to the first electronic device in response to the received broadcast signal.

In this embodiment, after the second electronic device receives the broadcast signal, if the second electronic device is in an available state, the second electronic device may send the acknowledgment signal to the first electronic device, to notify the first electronic device that the broadcast signal that is sent has been successfully received by the second electronic device, and perform a subsequent acknowledgment operation.

In a possible implementation, the broadcast signal carries a request sequence number corresponding to the display instruction. To notify the first electronic device that the acknowledgment signal is a signal fed back based on the broadcast signal, the second electronic device may add a request sequence number corresponding to the display instruction to the acknowledgment signal, so that the first electronic device may determine a signal corresponding to the acknowledgment signal.

In this embodiment, the first electronic device may establish a corresponding signal processor at an application framework layer, to process a signal fed back based on each broadcast signal. The signal processor may be upward compatible with each application program running at an application layer of the first electronic device. To be specific, both a broadcast signal generated by each application program running at the application layer of the first electronic device, and an acknowledgment signal generated after being received by the second electronic device may be processed by a signal processor at the application framework layer of the first electronic device. The first electronic device may receive, through a corresponding communication module, the acknowledgment signal sent by the second electronic device, and the first electronic device may identify the received acknowledgment signal through a corresponding signal processor running at the application framework layer, and respond based on an identification result. After receiving, through the signal processor at the application framework layer, the acknowledgment signal fed back by the second electronic device, the first electronic device may determine that the second electronic device may respond to the display operation, and the first electronic device does not need to locally display a second page associated with the first page. The first electronic device outputs, through the application framework layer, a response completion instruction for remote display, and uploads the response completion instruction to an application program running at the application layer of the first electronic device, to notify the application program that the response to the display operation initiated by the user is completed.

Still referring to FIG. 13, the application framework layer of the first electronic device may be configured to receive a signal fed back based on the broadcast signal, for example, the acknowledgment signal. After receiving the acknowledgment signal sent by the second electronic device, the application framework layer of the first electronic device may determine that a state of the second electronic device is in an available state, to be specific, may be configured to display the second page associated with the first page, and display the second page through the second electronic device.

In a possible implementation, after receiving the broadcast signal of the first electronic device through the communication module, the second electronic device may process the broadcast signal at any level such as an application layer or an application framework layer.

In embodiments of this application, the broadcast signal including the display instruction is generated through the application layer of the first electronic device, so that the second electronic device feeds back the acknowledgment signal after receiving the broadcast signal. The first electronic device may determine, through the acknowledgment signal, that the second electronic device has responded to the previously sent display instruction. Therefore, it is ensured that the second page is normally displayed, and current accuracy and success rate of the page are improved.

Optionally, in another embodiment of this application, after S1202, S1204 and S1205 may be further included. Detailed descriptions are as follows.

After the first electronic device sends the broadcast signal to the second electronic device, the method further includes:

In S1204, if an application framework layer of the first electronic device does not receive the acknowledgment signal fed back by the second electronic device, the first electronic device sends a local display instruction to the application layer through the application framework layer.

In this embodiment, the signal processor may be configured at the application framework layer of the first electronic device, and the signal processor of the first electronic device may be preconfigured with the longest waiting duration. If the signal processor running on the application framework layer of the first electronic device does not receive, in preset longest waiting duration, the acknowledgment signal fed back by the second electronic device, it may indicate that the broadcast signal sent by the first electronic device through the application layer is not received by the second electronic device. In this case, it may be identified that the second electronic device is in an unavailable state and needs to respond locally. Based on this, the first electronic device may generate, through the signal processor running at the application framework layer, a local display instruction indicating that a local display instruction of the second page is displayed on the first electronic device, and the local display instruction is transmitted to the application layer. Specifically, the local display instruction is transmitted through the signal processor at the application framework layer to an application program running at the application layer, so that the application program running at the application layer of the first electronic device displays the second page.

In a possible implementation, if the second electronic device is in an offline state, the second electronic device does not receive the broadcast signal sent by the first electronic device, and does not generate a corresponding acknowledgment signal based on the broadcast signal.

In a possible implementation, if the second electronic device is in a power-off state, the second electronic device does not receive the broadcast signal sent by the first electronic device, and does not generate a corresponding acknowledgment signal based on the broadcast signal.

In S1205, the application layer of the first electronic device displays the second page on the first electronic device in response to the received local display instruction.

In this embodiment, after receiving the local display instruction fed back by the application framework layer, the application layer of the first electronic device may display a second page associated with the first page on the first electronic device. A specific process of displaying the second page may be: The first electronic device may switch an originally running application program to a background for display, start, based on a page type of the second page associated with the first page, an associated program corresponding to the page type, run the associated program at the application layer of the first electronic device, and display the second page through the associated program. For example, if the page type of the second page is a product purchase page type, an associated program corresponding to the page type may be a shopping application program, and the first electronic device may run the shopping application program, and generate, in the shopping application program, a shopping page associated with the first page, namely, the second page.

Still referring to FIG. 13, if the application framework layer of the first electronic device does not receive the acknowledgment signal fed back by the second electronic device, it is identified that the second application program is in an unavailable state, and therefore the second page is displayed through the first electronic device.

Figure 14A:
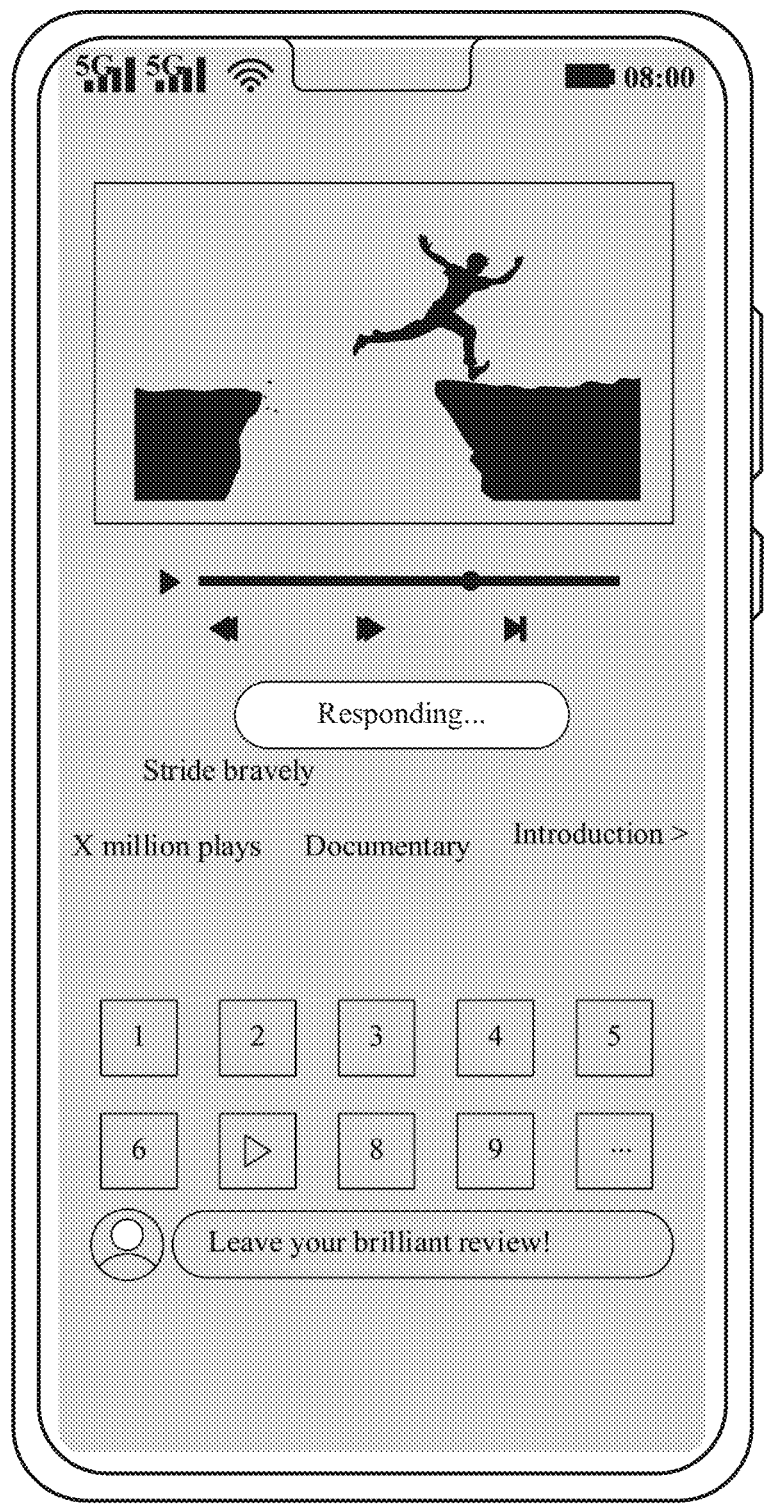
FIG. 14(a), FIG. 14(b), and FIG. 14(c) are schematic diagrams of displaying a second page through a first electronic device according to an embodiment of this application.
Figure 14B:
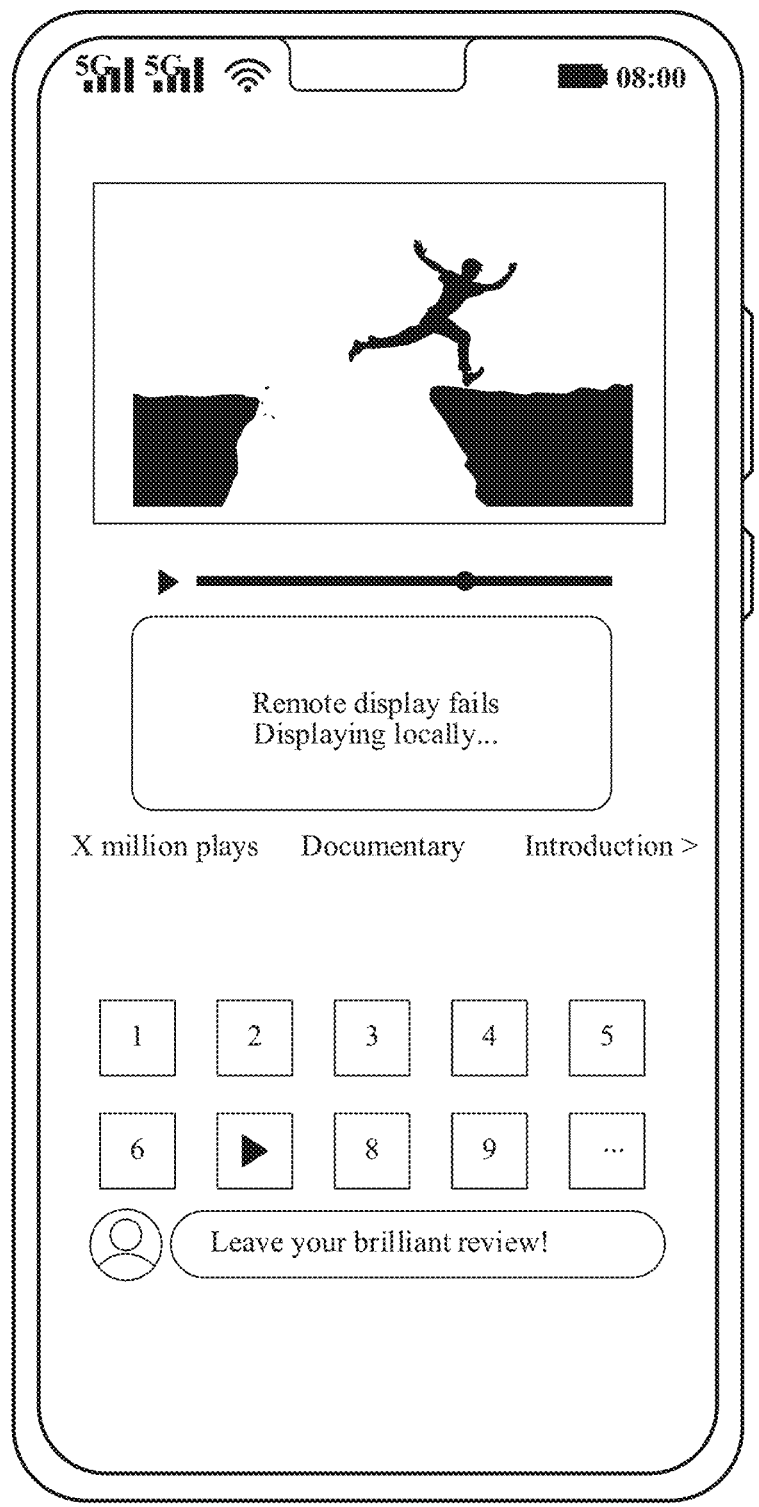
Figure 14C:
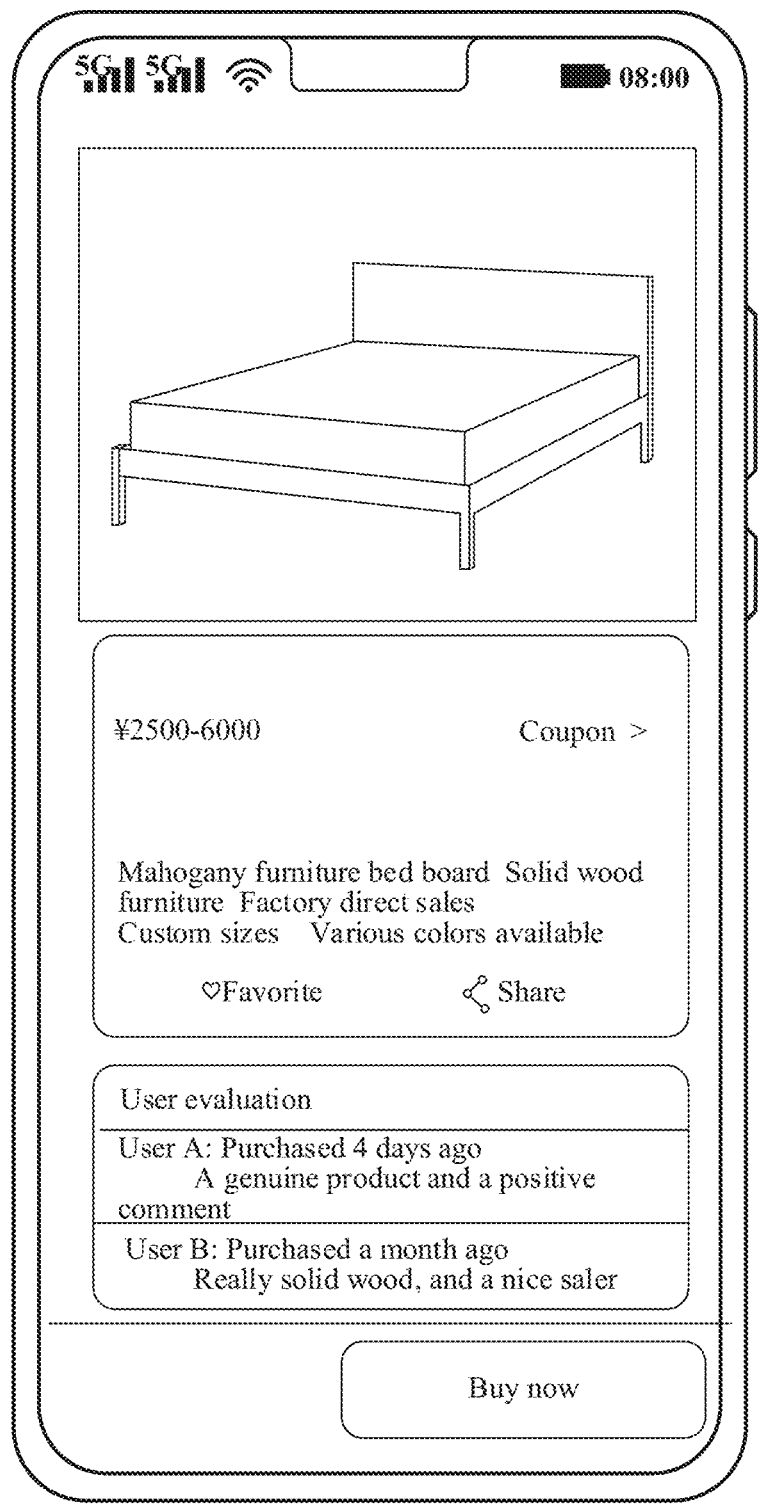

For example, FIG. 14(a), FIG. 14(b), and FIG. 14(c) are schematic diagrams of displaying a second page through a first electronic device according to an embodiment of this application. Referring to FIG. 14(a), after receiving a display operation initiated by a user on a first page, the first electronic device may display a display control "responding", to notify the user that the second page is being displayed. If an application framework layer of the first electronic device does not receive an acknowledgment signal of a second electronic device, the application framework layer of the first electronic device sends a local display instruction to an application layer. In this case, prompt information "remote display fails" may be displayed in an application program of the first electronic device, as shown in FIG. 14(b). Then, the first electronic device may start an application program associated with the second page, and generate the second page through the application program associated with the second page, as shown in FIG. 14(c).

Figure 15A:
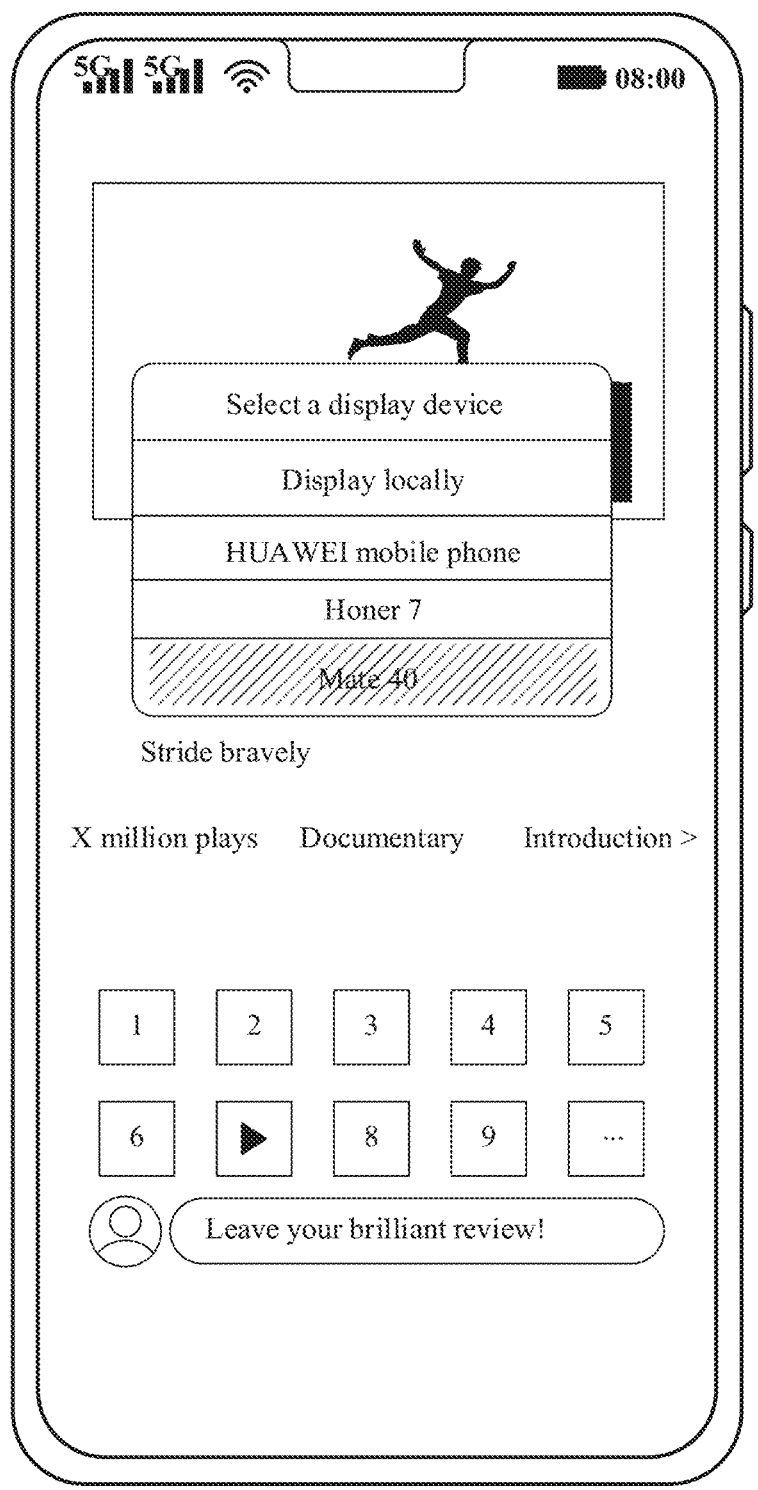
FIG. 15(a) and FIG. 15(b) are schematic diagrams of a selectable device list according to an embodiment of this application.
Figure 15B:
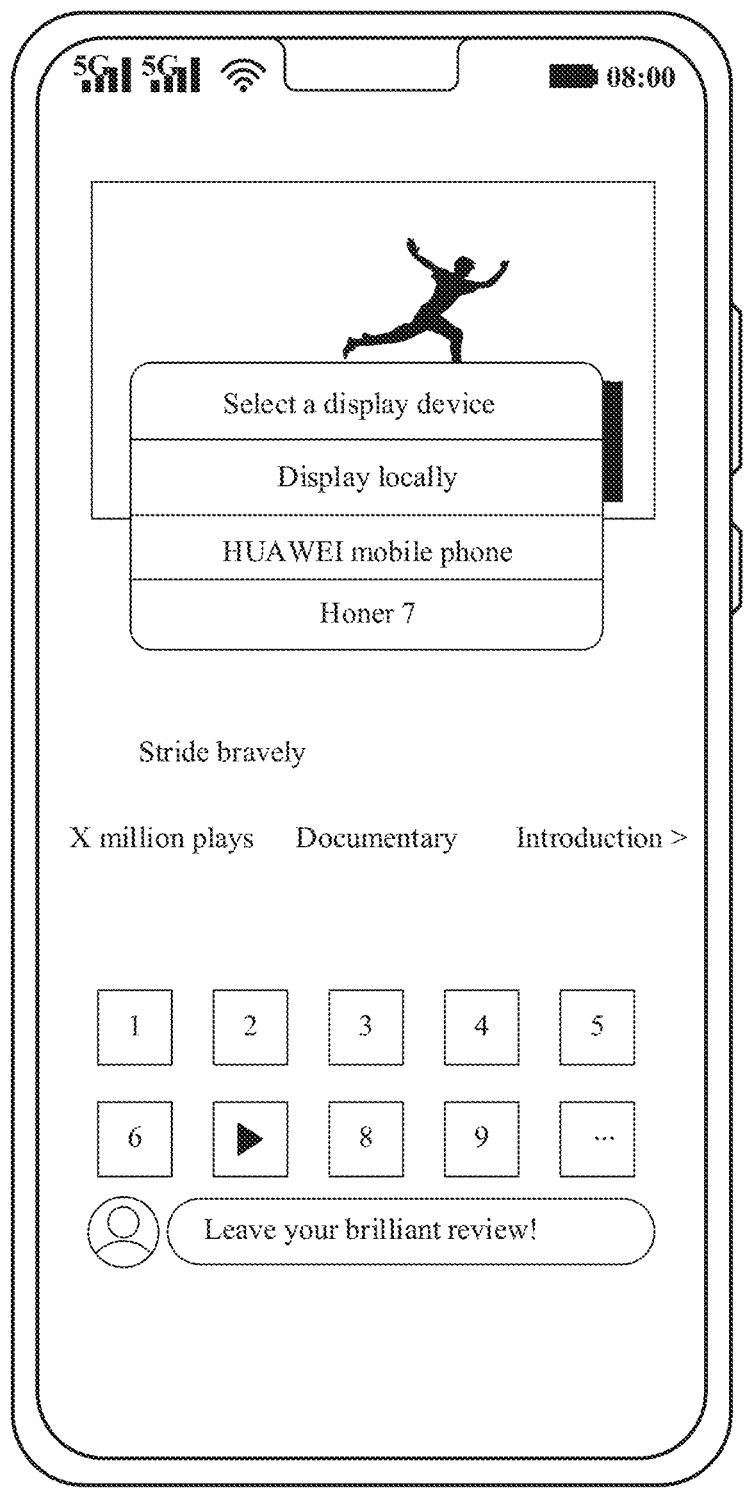

In a possible implementation, if the first electronic device identifies that the second electronic device is in an unavailable state, including an acknowledgment signal of the second electronic device that is not received, or an occupation signal of the second electronic device is received, the first electronic device may display a selectable device list, and remove the second electronic device from the selectable device list or display the fact that the second electronic device is in an unselected state. FIG. 15(a) and FIG. 15(b) are schematic diagrams of a selectable device list according to an embodiment of this application (A device identifier of the second electronic device is Mate 40). In this way, the user reselects another electronic device from the device selection list to display the second page.

In embodiments of this application, if the first electronic device does not receive the acknowledgment signal fed back by the second electronic device, the first electronic device may identify that the second electronic device is in the unavailable state. In this case, display may be performed locally, so that a normal response of the second page may be ensured, and the user does not need to repeatedly perform a display operation. This improves use experience of the user.

Optionally, in another embodiment of this application, after S1202, S1206 and S1208 may be further included. Detailed descriptions are as follows.

After the first electronic device sends the broadcast signal to the second electronic device, the method further includes:

In S1206, if the second electronic device is in an occupied state, the second electronic device sends a device occupation signal to the first electronic device.

In this embodiment, if the second electronic device is in an occupied state, for example, the second electronic device is being configured to display a remote display operation of another electronic device other than the first electronic device, in this case, the second electronic device cannot respond to a display instruction sent by the first electronic device, to be specific, cannot display the second page on the second electronic device. In this case, the second electronic device may send a device occupation signal to the first electronic device, to notify the first electronic device that the display instruction that is sent cannot be responded to.

In S1207, the first electronic device sends, in response to the device occupation signal, a local display instruction to the application layer through an application framework layer.

In this embodiment, the first electronic device may receive, through a signal processor running at the application framework layer, a device occupation signal sent by the second electronic device. After receiving the device occupation signal, the signal processor may identify that the second electronic device is in an unavailable state. In this case, the first electronic device needs to locally display the second electronic device. Therefore, a local display instruction may be generated, so that an associated program corresponding to the second page face is run at the application layer, and the second page face is displayed through the associated program.

In S1208, the application layer of the first electronic device displays the second page on the first electronic device in response to the received local display instruction.

In this embodiment, because an implementation of S1208 is the same as an implementation of S1205, for detailed descriptions, refer to related descriptions of S1205, and details are not described herein again.

In embodiments of this application, if the first electronic device receives the device occupation signal fed back by the second electronic device, the first electronic device may identify that the second electronic device is in the unavailable state. In this case, display may be performed locally, so that a normal response of the second page may be ensured, and the user does not need to repeatedly perform a display operation. This improves user experience.

In embodiments of this application, the first electronic device completes, through two different levels, the page display method provided in this application. A display operation of the user is obtained through an application layer of the first electronic device, and a broadcast signal is generated. A signal (such as an acknowledgment signal or a device occupation signal) that is fed back based on the broadcast signal is received through the application framework layer, and a corresponding response operation is performed. Because the application framework layer may be reused by various application programs, difficulty and development workload of the application programs are greatly reduced.

Figure 16:
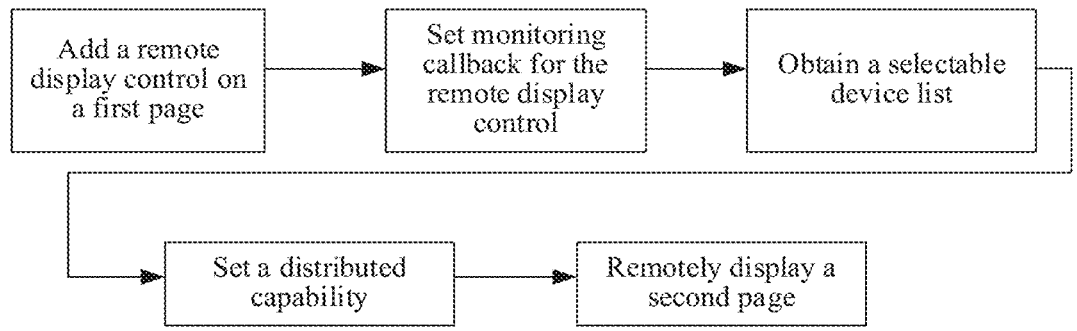
FIG. 16 is a schematic flowchart of displaying a second page according to an embodiment of this application.

For example, FIG. 16 is a schematic flowchart of displaying a second page according to an embodiment of this application. Referring to FIG. 16, when the second page is displayed remotely, the method may specifically include the following steps. Add a remote display control on a first page→set monitoring callback for the control→obtain a selectable device list that may be displayed on a second page→set a distributed capability (which specifically includes determining a device state of a second electronic device, to be specific, whether the second electronic device is in an available state)→remotely display the second page. Therefore, if a first page displayed in an application program may support remote display of an associated second page, modules corresponding to the foregoing steps need to be added in the application program. This greatly increases development workload of the application program, to be specific, increases difficulty of remote display of the page. Based on this, to resolve the foregoing problem of the large development workload, in embodiments of this application, some steps are moved down to an application framework layer for completion, and only some steps need to be completed at the application layer, namely, "add a remote display control on a first page-set monitoring callback for the control-obtain a selectable device list that may be displayed on a second page" described above. In this case, modules corresponding to the foregoing three steps only need to be added to the application program running at the application layer, and modules for all steps do not need to be added. This greatly reduces the development workload of the application program. Because the application framework layer may be reused for all application programs, logic of some steps is handed over to the application framework layer for completion. In this case, only a corresponding module needs to be added to the application framework layer of the first electronic device. This reduces application difficulty of remote display of the second page.

Figure 17:
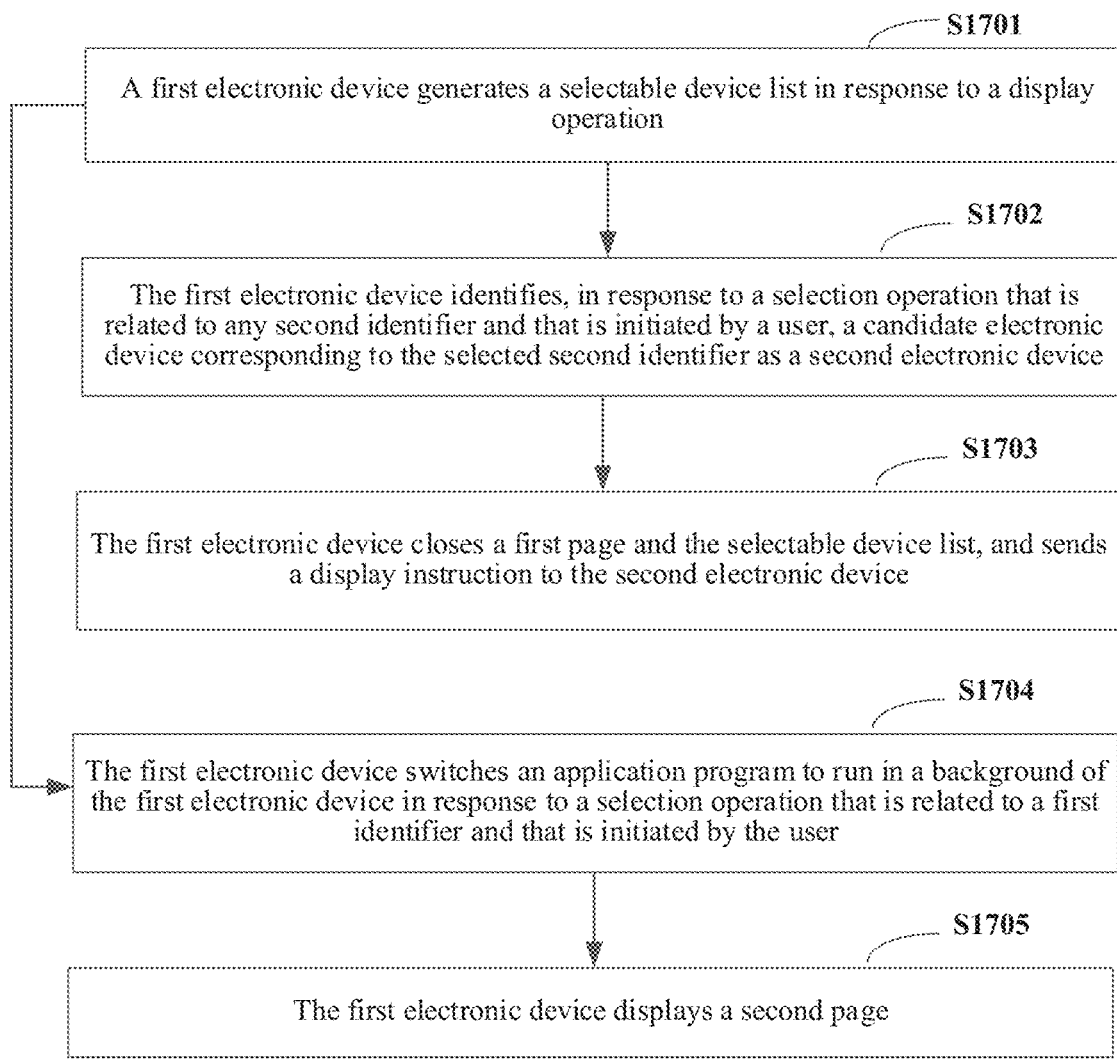
FIG. 17 is a flowchart of a specific implementation of S702 in a page display method according to an embodiment of this application.

Further, in another embodiment of this application, FIG. 17 is a flowchart of a specific implementation of S702 according to an embodiment of this application. Referring to FIG. 17, compared with the embodiment shown in FIG. 7. S702 in embodiments of this application specifically includes S1701 to S1705. Detailed descriptions are as follows.

In S1701, the first electronic device generates a selectable device list in response to the display operation, where the selectable device list includes a first identifier of the first electronic device and a second identifier of at least one candidate electronic device that establishes an interconnection relationship with the first electronic device.

In this embodiment, when receiving a display operation related to a first page initiated by the user, the first electronic device may enable the user to select whether to locally display a second page associated with the first page or remotely display the second page. Based on this, the first electronic device may generate a selectable device list. The selectable device list includes device identifiers of all electronic devices on which the second page may be displayed. Because the second page may be displayed locally or remotely, the selectable device list includes a first identifier of the first electronic device, and another electronic device that establishes an interconnection relationship with the second electronic device, namely, a second identifier of the candidate electronic device.

Figure 18A:
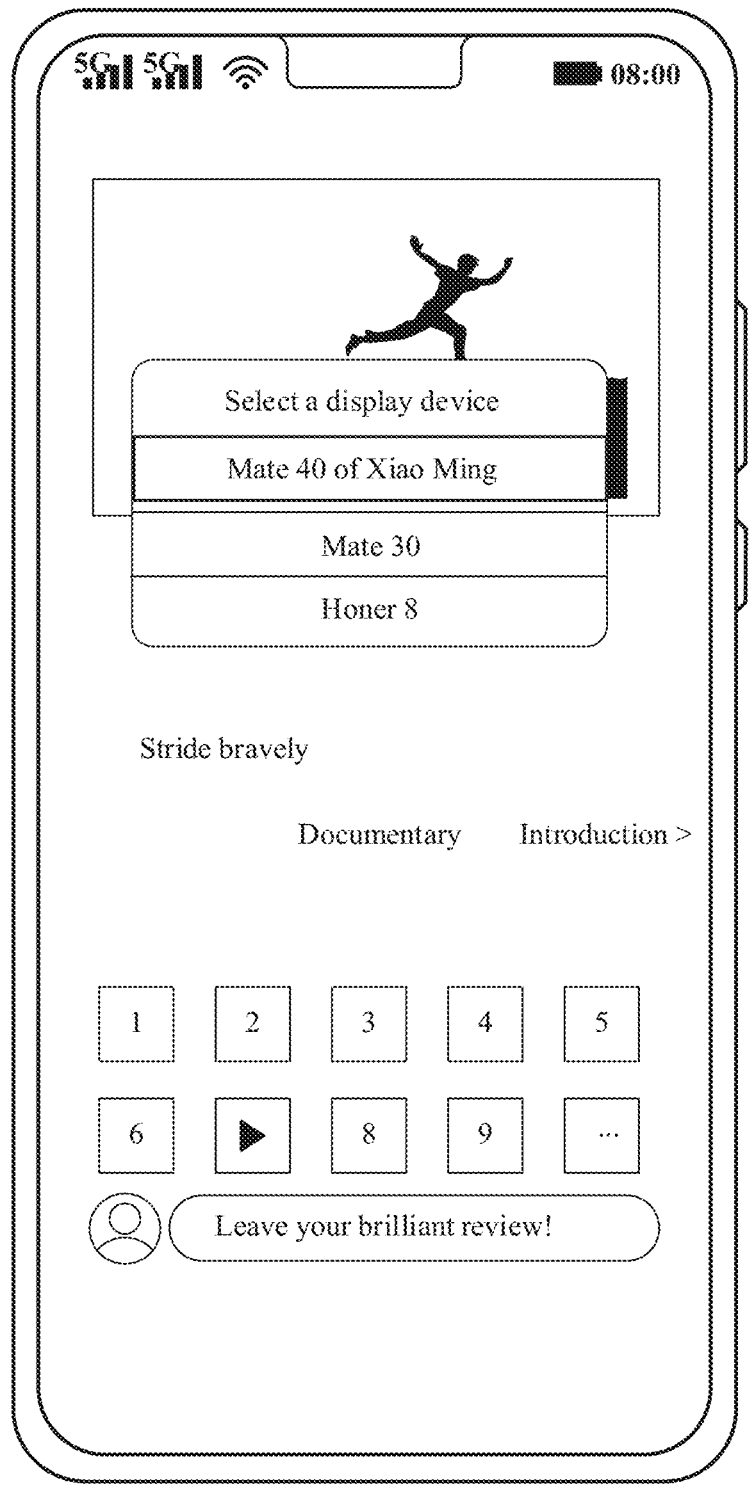
FIG. 18(a) and FIG. 18(b) are schematic diagrams of a selectable device list according to an embodiment of this application.
Figure 18B:
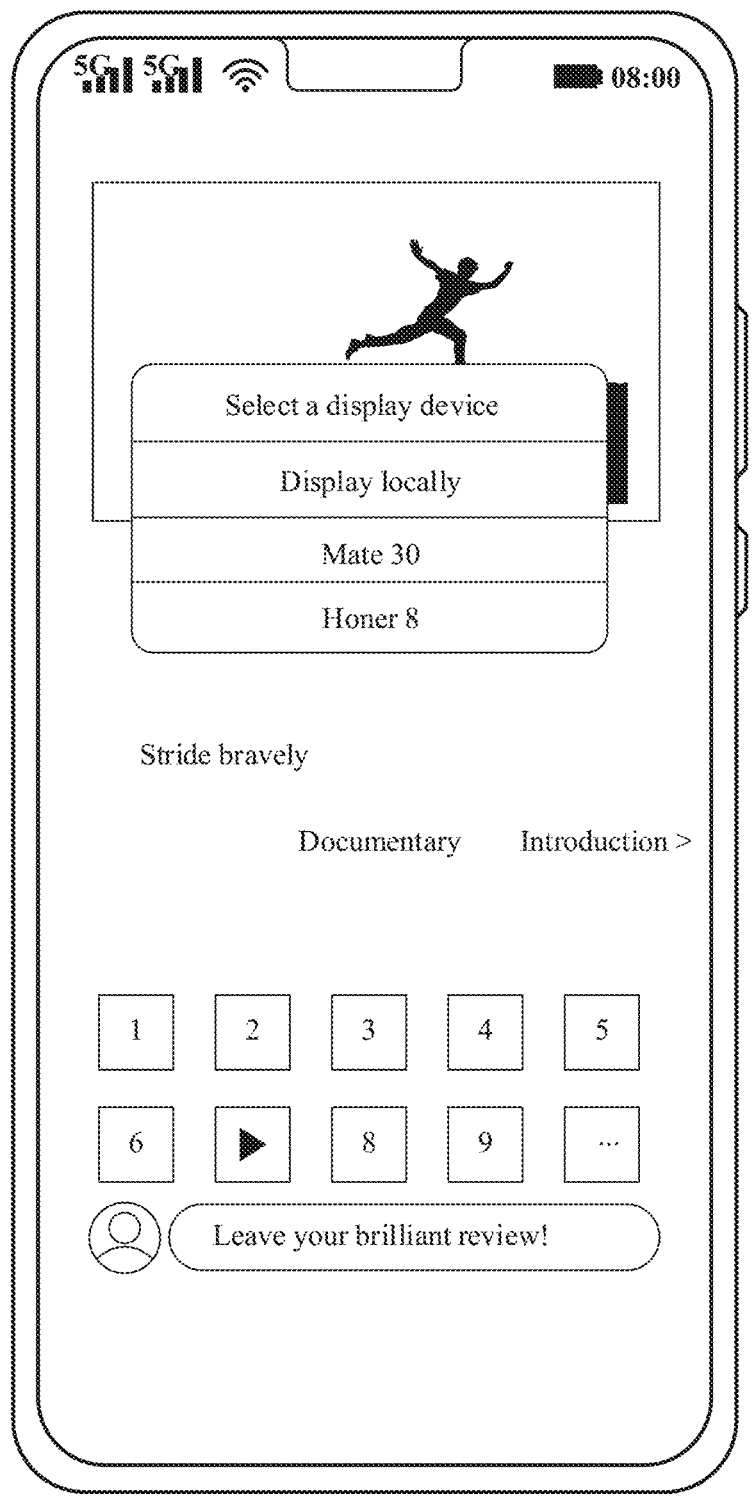

For example. FIG. 18(a) and FIG. 18(b) are schematic diagrams of a selectable device list according to an embodiment of this application. Referring to FIG. 18(a), a first identifier of a first electronic device in the selectable device list may be a preset device name, and the device name may be a device model, manually configured by a user, or the like. In FIG. 18(a), the first identifier of the first electronic device is manually configured by the user, namely, "Mate 40 of Xiao Ming", and a second identifier of a candidate electronic device may also be a corresponding device name, for example, Mate 30 or Honer 8. To distinguish the first electronic device from the candidate electronic device, all candidate electronic devices in the selectable device list may be grouped into one list group, and belong to two different list groups from the first electronic device. Referring to FIG. 18(b), the first identifier of the first electronic device in the selectable device list may be directly marked as "locally displayed", and the second identifier of another candidate electronic device may be a corresponding device name, so that it may be used to directly determine which devices are local devices, and which devices are remote devices.

In a possible implementation, the selectable device list may be generated by an application program running at an application layer of the first electronic device.

In a possible implementation, different second pages may be associated with corresponding electronic devices, namely, a preferred electronic device. An electronic device corresponding to the second page may be the first electronic device or may be any candidate electronic device. If the first electronic device does not receive a selection operation of the user in a preset waiting time period, the first electronic device may generate a selection instruction based on a device identifier of the electronic device corresponding to the second page, to perform S1702 or perform an operation of S1704. The selection instruction may carry a first identifier or a second identifier.

Optionally, a confirmation control may be further configured in the selectable device list. In this case, the user needs to click, in the selectable device list, a device identifier (for example, a first identifier or a second identifier) of an electronic device that needs to be selected, and then click the confirmation control, so that the first electronic device identifies that the user initiates a complete selection operation. To be specific, the user needs to confirm the selected electronic device, and determine, based on the device identifier clicked by the user, to perform an operation of S1702 or S1704. If the first electronic device detects that the user clicks the confirmation control when the user does not select the electronic device, an electronic device associated with the second page may be used as an electronic device selected by the user, and a selection instruction is generated based on the device identifier of the electronic device corresponding to the second page, to perform S1702 or perform an operation of S1704.

In a possible implementation, the first electronic device may record a candidate electronic device that has recently remotely displayed another page. Similarly, the candidate electronic device that has recently remotely displayed another page may also be used as a preferred electronic device. For a selection manner of the preferred electronic device, refer to an implementation of the foregoing embodiment to complete a preferred operation. Details are not described herein again.

Optionally, S1701 may include the following two steps.

Step 1. The first electronic device receives, through a wireless communication module, a wireless communication signal that is broadcast by each candidate electronic device, where each wireless communication signal carries the second identifier of the candidate electronic device.

Step 2. The first electronic device generates the selectable device list based on all the received wireless communication signals.

In this embodiment, before generating the selectable device list, the first electronic device may determine specific candidate electronic devices that currently have an interconnection relationship with the first electronic device. Based on this, the first electronic device may receive, through a wireless communication module, a wireless communication signal broadcast and sent by each candidate electronic device, where the wireless communication module is a Bluetooth communication module. The corresponding wireless communication signal is specifically a Bluetooth signal. Certainly, if a Wi-Fi point-to-point communication connection may be established between the first electronic device and the second electronic device, the wireless communication module may be a Wi-Fi module, and correspondingly, the wireless communication signal may be a Wi-Fi signal.

In this embodiment, the first electronic device may generate the selectable device list based on a second identifier that is of the candidate electronic device and that is carried in each wireless communication signal. Because the wireless communication signal of the candidate electronic device may be obtained by searching, to be specific, it indicates that a communication connection may be established with the candidate electronic device to implement data interconnection, the candidate electronic device may be added to the selectable device list, so that all candidate electronic devices included in the selectable device list are in an available state, and a remote display success rate of the second page is improved.

In S1702, the first electronic device identifies, in response to a selection operation that is related to any second identifier and that is initiated by the user, a candidate electronic device corresponding to the selected second identifier as the second electronic device.

In this embodiment, the first electronic device may receive a selection operation initiated by the user based on the displayed selectable device list, for example, receive a clicking operation of the user on the selectable device list, use a second identifier corresponding to the clicking operation as a second identifier selected by the user, and use a candidate electronic device corresponding to the second identifier as a second electronic device that needs to remotely display the second page.

In S1703, the first electronic device closes the first page and the selectable device list, and sends the display instruction to the second electronic device.

In this embodiment, after determining the second electronic device, the first electronic device may close the first page and the displayed selectable device list, continue to run an originally running application program, and send a display instruction to the second electronic device, to notify the second electronic device to display a second page associated with the first page. For a manner of sending the display instruction, refer to the description of any one of the foregoing embodiments, such as the embodiment shown in FIG. 12 and the description of S702 in FIG. 7. Details are not described herein again.

Optionally, if the display instruction is sent by using the embodiment shown in FIG. 12, and if the first electronic device does not receive an acknowledgment signal fed back by the second electronic device, or receives a device occupation signal fed back by the second electronic device, the second electronic device that is sent in this case may be deleted from the selectable device list. Alternatively, a second identifier of an unavailable second electronic device in this case is adjusted to an unselectable state, and the adjusted selectable device list is displayed again, so that the user reselects the second electronic device from the selectable device list.

Optionally, in another embodiment of this application, after S1701, the method may further include:

In S1704, the first electronic device switches, in response to a selection operation that is related to the first identifier and that is initiated by the user, the application program to run in a background of the first electronic device.

In this embodiment, after receiving the selection operation of the user, if the first electronic device determines that the selection operation of the user is a selection operation for the first identifier in the selectable device list, the first electronic device identifies that a local display process needs to be performed, to be specific, a second page associated with the first page does not need to be displayed through the second electronic device.

In this embodiment, when the first electronic device needs to locally display the second page, the first electronic device needs to switch a currently running application program from running in a foreground to running in a background, and start an associated program corresponding to the second page.

In S1705, the first electronic device displays the second page.

In this embodiment, the first electronic device may generate the second page through the associated program corresponding to the second page, to locally display the second page in the first electronic device.

Figure 19:
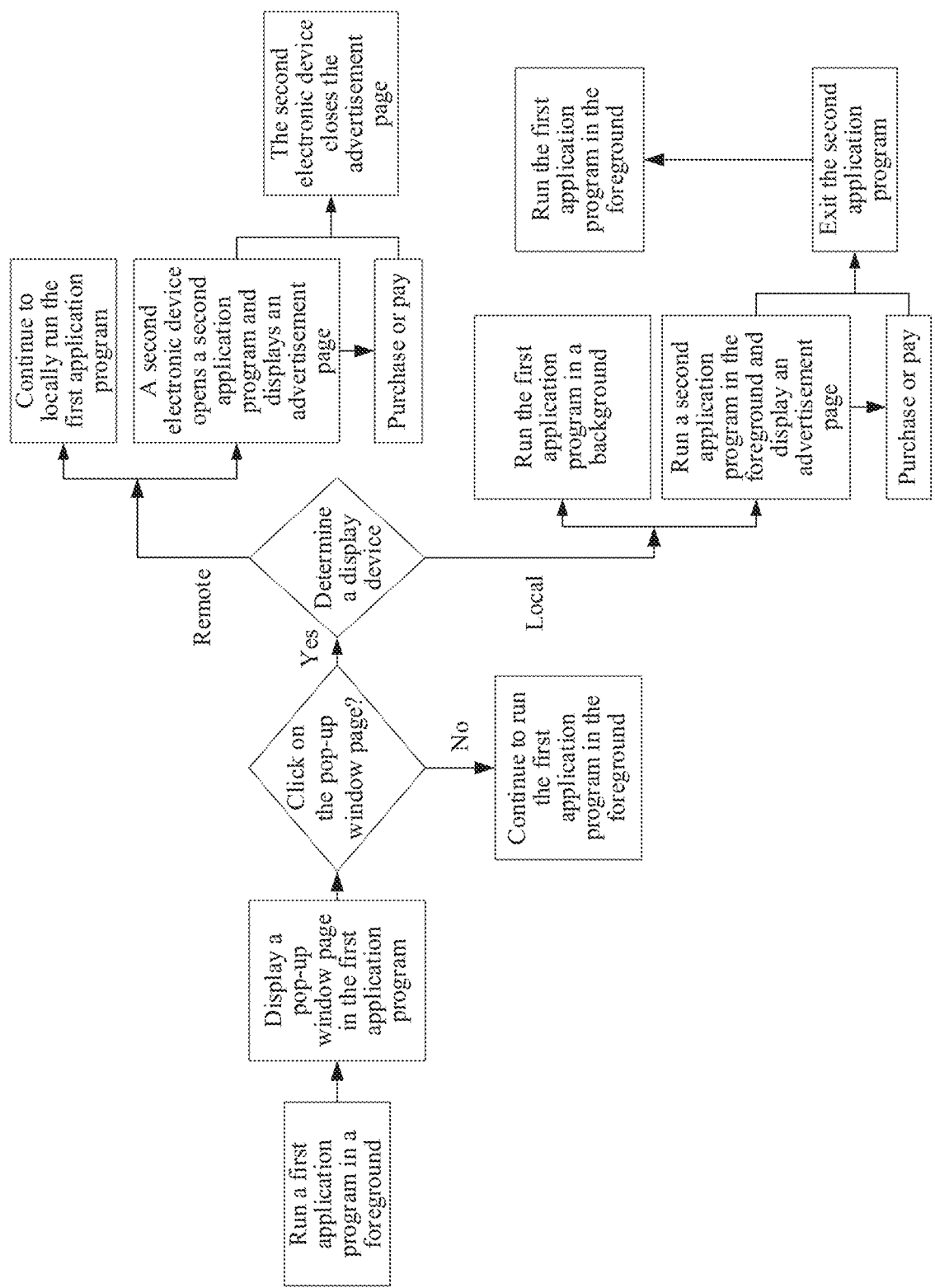
FIG. 19 is a schematic flowchart of a page display method according to an embodiment of this application.

For example, FIG. 19 is a schematic flowchart of a page display method according to an embodiment of this application. It may be learned from comparison with FIG. 5 that, in embodiments of this application, remote display of the second page (namely, an advertisement page) is supported, to be specific, a display instruction may be sent to the second electronic device, so that the second page is displayed on the second electronic device, and the first electronic device may maintain running an original application program. Therefore, continuity of application running is improved, and use experience of the user is improved.

In embodiments of this application, when the user initiates the display operation, the first electronic device may display the selectable device list, so that the user may select an associated electronic device from the selectable device list to display the second page. This improves a display effect of the second page. It is also convenient for the user to select a proper device for display, thereby improving the use experience of the user.

In S703, the second electronic device displays, in response to the display instruction, a second page associated with the first page on the second electronic device.

In this embodiment, after receiving the display instruction sent by the first electronic device, the second electronic device may respond to the display instruction. The display instruction may carry a page identifier (such as a page domain name or a network address) of the second page, or may carry a jump link corresponding to the first page. The second electronic device may display the second page locally based on the page identifier of the second page or the jump link.

Still referring to FIG. 11(b), as described above, after responding to the display operation initiated by the user, the first electronic device may close the first page on the first electronic device. In this case, the first electronic device sends a display instruction to the second electronic device, and the second electronic device may display the second page on a display module of the second electronic device based on the display instruction, to implement an objective of remotely displaying detailed content of information that needs to be pushed, for example, displaying a detailed advertisement page.

It may be learned from the above that in the page display method provided in embodiments of this application, a first page that carries information that needs to be pushed is displayed on the first electronic device, a display instruction is sent to an interconnected second electronic device when a display operation initiated by the user on the first page is received, and the first page is closed locally on the first electronic device, and an application program continues to run in a foreground. In addition, after receiving the display instruction sent by the first electronic device, the second electronic device may display the second page associated with the first page on the second electronic device. This avoids that the user needs to frequently switch application programs when obtaining detailed information on the first page or performing a corresponding operation on information content on the first page. Continuity of running of the application program is maintained, and operation efficiency of the application program may also be improved.

In addition to maintaining continuity of running of the application program, this embodiment may further implement functions of sharing the second page and projecting the second page. When the user views page content that the user is interested on the first electronic device, namely, the first page, the user may send a display instruction to the second electronic device held by the user that needs to be shared, so that the second page associated with the first page is displayed on the second electronic device. This implements an objective of content sharing, and improves efficiency and a sharing mode of content sharing. In another application scenario, if the second electronic device is specifically a display device such as a smart television or a projector, a screen projection function of the first page on another display device other than the first electronic device may be implemented. This improves screen projection efficiency.

Embodiment 2

Figure 20:
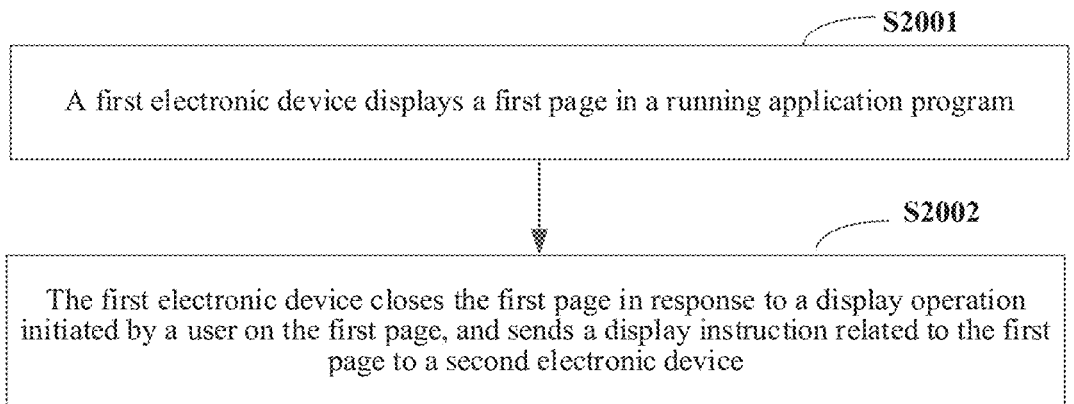
FIG. 20 is a flowchart of an implementation of a page display method on a side of a first electronic device according to an embodiment of this application.

Embodiment 1 describes an implementation process of the page display method from a perspective of interaction between a first electronic device and a second electronic device. In Embodiment 2, an implementation process of the page display method is described by using the first electronic device as an execution entity of a procedure. FIG. 20 is a flowchart of an implementation of a page display method on a side of a first electronic device according to Embodiment 2 of this application. Details are as follows.

In S2001, the first electronic device displays a first page in a running application program.

In S2002, the first electronic device closes the first page in response to a display operation initiated by a user on the first page, and sends a display instruction related to the first page to a second electronic device, so that the second electronic device displays, after receiving the display instruction, a second page associated with the first page on the second electronic device.

Optionally, that the first electronic device closes the first page in response to a display operation initiated by a user on the first page, and sends a display instruction related to the first page to a second electronic device includes:

The first electronic device obtains, through an application layer, the display operation initiated by the user in the application program, and generates, through the application layer, a broadcast signal carrying the display instruction.

The first electronic device sends the broadcast signal to the second electronic device.

If the first electronic device receives, through an application framework layer, an acknowledgment signal that is fed back by the second electronic device based on the broadcast signal, the first electronic device identifies that the second electronic device has displayed the second page.

Optionally, after the first electronic device sends the broadcast signal to the second electronic device, the method further includes:

If the application framework layer of the first electronic device does not receive the acknowledgment signal fed back by the second electronic device, or receives a device occupation signal fed back by the second electronic device, the first electronic device sends a local display instruction to the application layer through the application framework layer.

The application layer of the first electronic device displays the second page on the first electronic device in response to the received local display instruction.

Optionally, that the first electronic device closes the first page in response to a display operation initiated by a user on the first page, and sends a display instruction related to the first page to a second electronic device includes.

The first electronic device generates a selectable device list in response to the display operation, where the selectable device list includes a first identifier of the first electronic device and a second identifier of at least one candidate electronic device that establishes an interconnection relationship with the first electronic device.

The first electronic device identifies, in response to a selection operation that is related to any second identifier and that is initiated by the user, a candidate electronic device corresponding to the selected second identifier as the second electronic device.

The first electronic device closes the first page and the selectable device list, and sends the display instruction to the second electronic device.

Optionally, after the first electronic device generates a selectable device list in response to the display operation, the method further includes:

The first electronic device switches, in response to a selection operation that is related to the first identifier and that is initiated by the user, the application program to run in a background of the first electronic device.

The first electronic device displays the second page.

Optionally, that the first electronic device generates a selectable device list in response to the display operation includes:

The first electronic device receives, through a wireless communication module, a wireless communication signal broadcast that is by each candidate electronic device, where each wireless communication signal carries the second identifier of the candidate electronic device.

The first electronic device generates the selectable device list based on all the received wireless communication signals.

Embodiment 3

Figure 21:
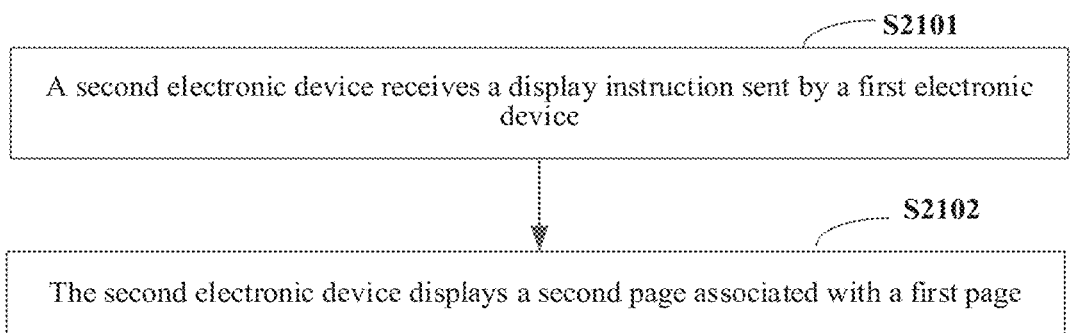
FIG. 21 is a flowchart of an implementation of a page display method on a side of a second electronic device according to an embodiment of this application.

Embodiment 1 describes an implementation process of the page display method from a perspective of interaction between a first electronic device and a second electronic device. In Embodiment 3, an implementation process of the page display method is described by using the second electronic device as an execution entity of a procedure. FIG. 21 is a flowchart of an implementation of a page display method on a side of a second electronic device according to an embodiment of this application. Details are as follows.

In S2101, the second electronic device receives a display instruction sent by a first electronic device, w % here the display instruction is sent by the first electronic device to the second electronic device in response to a display operation initiated by a user on a first page, and the first page is a page displayed by the first electronic device in a running application program.

In S2102, the second electronic device displays a second page associated with the first page.

Optionally, that the second electronic device receives a display instruction sent by a first electronic device includes;

The second electronic device receives a broadcast signal that carries the display instruction and that is sent by the first electronic device.

The second electronic device sends an acknowledgment signal to the first electronic device in response to the broadcast signal.

Optionally, after the second electronic device receives a broadcast signal that carries the display instruction and that is sent by the first electronic device, the method further includes:

If the second electronic device is in an occupied state, the second electronic device sends a device occupation signal to the first electronic device, to cause the second page to be displayed on the first electronic device.

Embodiment 4

Figure 22:
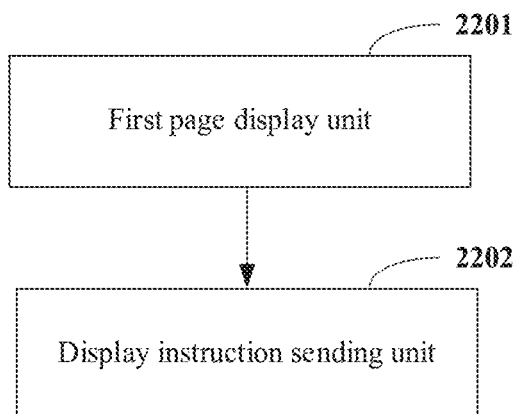
FIG. 22 is a block diagram of a structure of a page display apparatus according to an embodiment of this application.

Corresponding to the page display method described in Embodiment 2, FIG. 22 is a block diagram of a structure of a page display apparatus according to an embodiment of this application. For ease of description, only a part related to embodiments of this application is shown.

Referring to FIG. 22, the apparatus displayed on the page includes:

a first page display unit 2201, configured to display a first page in a running application program; and a display instruction sending unit 2202, configured to close the first page in response to a display operation initiated by a user on the first page, and send a display instruction related to the first page to a second electronic device, so that the second electronic device displays, after receiving the display instruction, a second page associated with the first page on the second electronic device.

Optionally, the display instruction sending unit 2202 includes:

a broadcast signal generation unit, configured to obtain, through an application layer, the display operation initiated by the user in the application program, and generate, through the application layer, a broadcast signal carrying the display instruction;

a broadcast signal sending unit, configured to send the broadcast signal to the second electronic device; and an acknowledgment signal receiving unit, configured to: if an acknowledgment signal that is fed back by the second electronic device based on the broadcast signal is received through an application framework layer, identify that the second electronic device has displayed the second page.

Optionally, the page display apparatus further includes:

an unavailability response unit, configured to: if the application framework layer of the first electronic device does not receive the acknowledgment signal fed back by the second electronic device, or receives a device occupation signal fed back by the second electronic device, send a local display instruction to the application layer through the application framework layer; and a local display instruction execution unit, configured to display, by the application layer, the second page on the first electronic device in response to the received local display instruction.

Optionally, the display instruction sending unit 2202 includes:

a selectable device list generation unit, configured to generate a selectable device list in response to the display operation, where the selectable device list includes a first identifier of the first electronic device and a second identifier of at least one candidate electronic device that establishes an interconnection relationship with the first electronic device;

a second identifier response unit, configured to identify, in response to a selection operation that is related to any second identifier and that is initiated by the user, a candidate electronic device corresponding to the selected second identifier as the second electronic device; and a remote display execution unit, configured to close, the first page and the selectable device list, and send the display instruction to the second electronic device.

Optionally, the page display apparatus further includes:

a first identifier response unit, configured to switch, in response to a selection operation that is related to the first identifier and that is initiated by the user, the application program to run in a background of the first electronic device; and a local display unit, configured to display the second page.

Optionally, the selectable device list generation unit includes:

a wireless communication signal obtaining unit, configured to receive, through a wireless communication module, a wireless communication signal that is broadcast by each candidate electronic device, where each wireless communication signal carries the second identifier of the candidate electronic device; and a wireless signal identification unit, configured to generate the selectable device list based on all the received wireless communication signals.

Therefore, the page display apparatus provided in embodiments of this application may also display a first page that carries information that needs to be pushed on the first electronic device, a display instruction is sent to an interconnected second electronic device when a display operation initiated by the user on the first page is received, and the first page is closed locally on the first electronic device, and an application program continues to run in a foreground. In addition, after receiving the display instruction sent by the first electronic device, the second electronic device may display the second page associated with the first page on the second electronic device. This avoids that the user needs to frequently switch application programs when obtaining detailed information on the first page or performing a corresponding operation on information content on the first page. Continuity of running of the application program is maintained, and operation efficiency of the application program may also be improved.

Embodiment 5

Figure 23:
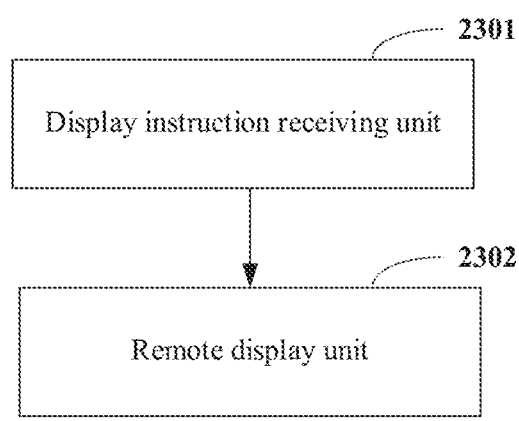
FIG. 23 is a block diagram of a structure of a page display apparatus according to an embodiment of this application.

Corresponding to the page display method described in Embodiment 3, FIG. 23 is a block diagram of a structure a page display apparatus according to an embodiment of this application. For ease of description, only a part related to embodiments of this application is shown.

Referring to FIG. 23, the apparatus displayed on the page includes:

a display instruction receiving unit 2301, configured to receive a display instruction sent by a first electronic device, where the display instruction is sent by the first electronic device to the second electronic device in response to a display operation initiated by a user on a first page, and the first page is a page displayed by the first electronic device in a running application program; and a remote display unit 2302, configured to display a second page associated with the first page.

Optionally, the display instruction receiving unit 2301 includes:

a broadcast signal receiving unit, configured to receive a broadcast signal that carries the display instruction and that is sent by the first electronic device; and an acknowledgment signal sending unit, configured to send an acknowledgment signal to the first electronic device in response to the broadcast signal.

Optionally, the page display apparatus further includes:

an occupation state response unit, configured to: if the second electronic device is in an occupied state, send a device occupation signal to the first electronic device, to cause the second page to be displayed on the first electronic device.

Figure 24:
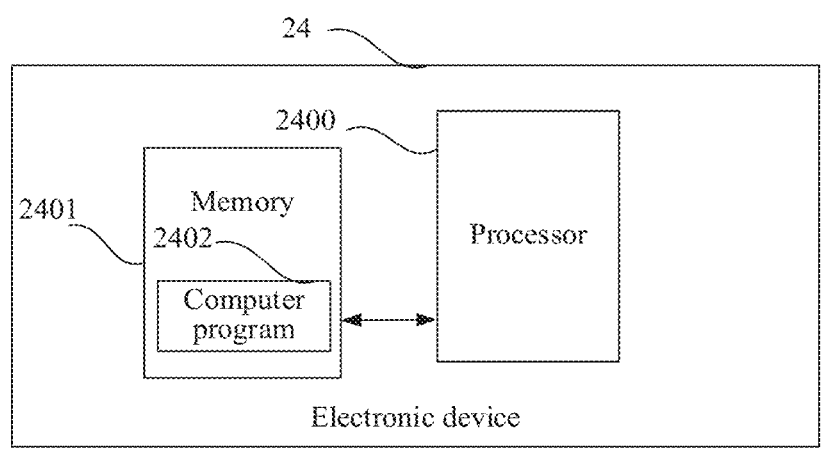
FIG. 24 is a block diagram of a structure of a page display apparatus according to an embodiment of this application.

FIG. 24 is a schematic diagram of a structure of an electronic device according to an embodiment of this application. As shown in FIG. 24, the electronic device 24 in this embodiment includes: at least one processor 2400, a memory 2401, and a computer program 2402 that is stored in the memory 2401 and that can be executed on the at least one processor 2400. When the processor 2400 executes the computer program 2402, the processor 2400 implements the steps in any of the page display method embodiments.

The electronic device 24 may be a computing device such as a desktop computer, a notebook computer, a palmtop computer, or a cloud server. The electronic device may include, but is not limited to, a processor 2400 and a memory 2401. A person skilled in the art may understand that FIG. 24 is merely an example of the electronic device 24, and does not constitute a limitation on the electronic device 24. The electronic device may include more or fewer components than those shown in the figure, or may combine some components, or may have different components. For example, the electronic device may further include an input/output device, a network access device, or the like.

The processor 2400 may be a central processing unit (Central Processing Unit, CPU). The processor 2400 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, or a discrete hardware component. The general purpose processor may be a microprocessor, or the processor may be any conventional processor or the like.

In some embodiments, the memory 2401 may be an internal storage unit of the electronic device 24, for example, a hard disk or a memory of the electronic device 24. In some other embodiments, the memory 2401 may alternatively be an external storage device of the electronic device 24, for example, a plug-connected hard disk, a smart media card (Smart Media Card, SMC), a secure digital (Secure Digital, SD) card, or a flash card (Flash Card) that is disposed on the electronic device 24. Further, the memory 2401 may further include both an internal storage unit of the electronic device 24 and an external storage device. The memory 2401 is configured to store an operating system, an application program, a boot loader (Boot Loader), data, another program, and the like, for example, program code of the computer program. The memory 2401 may be further configured to temporarily store data that has been output or is to be output.

It should be noted that content such as information exchange and process execution between the foregoing apparatuses/units are based on a same concept as those in the method embodiments of this application. For specific functions and brought technical effects of the foregoing apparatuses/units, refer to the method embodiments. Details are not described herein again.

A person skilled in the art may clearly understand that, for the purpose of convenient and brief description, division of the foregoing functional units and modules is merely used as an example for description. In actual application, the foregoing functions may be allocated to different functional units and modules for implementation based on a requirement. In other words, an inner structure of the apparatus is divided into different functional units or modules, to implement all or some of the functions described above. Functional units and modules in embodiments may be integrated into one processing unit, each of the units may exist alone physically, or two or more units may be integrated into one unit. The integrated unit may be implemented in a form of hardware, or may be implemented in a form of a software functional unit. In addition, specific names of the functional units and modules are merely for ease of distinguishing between the functional units and modules, but are not intended to limit the protection scope of this application. For a specific working process of the units or modules in the foregoing system, refer to a corresponding process in the method embodiments. Details are not described herein again.

Embodiments of this application further provide an electronic device. The electronic device includes: at least one processor, a memory, and a computer program that is stored in the memory and that can be executed on the at least one processor. When the processor executes the computer program, the processor implements the steps in any one of the method embodiments.

Embodiments of this application further provide a computer-readable storage medium. The computer-readable storage medium stores a computer program, and when the computer program is executed by a processor, the steps in the method embodiments may be implemented.

Embodiments of this application provide a computer program product. When the computer program product is run on a mobile terminal, the steps in the method embodiments may be implemented by the mobile terminal.

When the integrated unit is implemented in the form of the software function unit and sold or used as an independent product, the integrated unit may be stored in a computer-readable storage medium. Based on such an understanding, all or some of the procedures of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may at least include: The computer program code may be carried to any entity or apparatus of the photographing apparatus/electronic device, a recording medium, a computer memory, a read-only memory (ROM, Read-Only Memory), a random access memory (RAM, Random Access Memory), an electrical carrier signal, a telecommunication signal, and a software distribution medium. For example, a USB flash drive, a removable hard disk, a magnetic disk, or an optical disk. In some jurisdictions, the computer-readable medium cannot be an electrical carrier signal or a telecommunication signal according to legislation and patent practices.

In the foregoing embodiments, descriptions of the embodiments have respective focuses. For a part that is not described in detail in an embodiment, refer to related descriptions in another embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

The foregoing embodiments are merely used to describe the technical solutions of this application, but are not intended to limit the technical solutions. Although this application has been described in detail with reference to the foregoing embodiments, a person of ordinary skill in the art should understand that modifications may still be made to the technical solutions described in the foregoing embodiments, or equivalent replacements may be made to the part of the technical features; and however, these modifications or replacements do not deviate from the spirit and scope of the technical solutions in embodiments of this application, and shall fall within the protection scope of this application.

What is claimed is:
1. A page display method, comprising:
displaying, by a first electronic device, a first page in a running application program;
obtaining, by an application of the first electronic device, a display operation from a user on the first page;
closing, by the first electronic device, the first page in response to the display operation;
generating, through the application, a broadcast signal carrying a display instruction, wherein the display instruction is related to the first page;
sending, by the first electronic device, the broadcast signal to a second electronic device;
receiving, by the second electronic device, the broadcast signal;

sending, by the second electronic device in response to receiving the broadcast signal, an acknowledgment signal to the first electronic device; and displaying, by the second electronic device in response to the display instruction, a second page associated with the first page on a display of the second electronic device.

2. The page display method of claim 1, wherein after sending the broadcast signal to the second electronic device, the page display method further comprises:

sending, by the first electronic device when an application framework layer of the first electronic device does not receive the acknowledgment signal from the second electronic device, a local display instruction to an application layer of the first electronic device through the application framework layer; and displaying, by the application layer, the second page on the first electronic device in response to receiving the local display instruction.

3. The page display method of claim 1, wherein after sending the broadcast signal to the second electronic device, the page display method further comprises:

sending, by the second electronic device when the second electronic device is in an occupied state, a device occupation signal to the first electronic device;

sending, by the first electronic device in response to receiving the device occupation signal, a local display instruction to an application layer of the first electronic device through an application framework layer of the first electronic device; and displaying, by the application layer, the second page on the first electronic device in response to receiving the local display instruction.

4. A page display method applied to a first electronic device and comprising:

displaying a first page in a running application program;

obtaining, through an application of the first electronic device, a display operation initiated by a user in the running application program;

closing the first page in response to the display operation;

generating, through the application, a broadcast signal carrying a display instruction;

sending the broadcast signal to a second electronic device for displaying a second page associated with the first page; and receiving, by the first electronic device, an acknowledgment signal from the second electronic device that the second electronic device has displayed the second page.

5. The page display method of claim 4, wherein after sending the broadcast signal to the second electronic device, the page display method further comprises:

sending, when an application framework layer of the first electronic device does not receive the acknowledgment signal, a local display instruction to an application layer of the first electronic device through the application framework layer; and displaying, by the application layer, the second page on the first electronic device in response to receiving the local display instruction.

6. A page display method applied to a second electronic device and comprising:

receiving, from a first electronic device, a broadcast signal that carries a display instruction, wherein the display instruction is based a display operation by a user on a first page of the first electronic device, and wherein the first page is displayed by the first electronic device in a running application program;

sending, to the first electronic device when the second electronic device is in an available state, an acknowledgment signal in response to receiving the broadcast signal;

displaying, when the second electronic device is in the available state, a second page associated with the first page; and sending, when the second electronic device is in an occupied state, a device occupation signal to the first electronic device in order to cause the second page to be displayed on the first electronic device.

7. The page display method of claim 4, wherein after sending the broadcast signal to the second electronic device, the page display method further comprises:

sending, when application framework layer receives a device occupation signal from the second electronic device, a local display instruction to an application layer of the first electronic device through the application framework layer; and displaying, by the application layer, the second page on the first electronic device in response to receiving the local display instruction.

8. The page display method of claim 2, further comprising determining, by the first electronic device, that the application framework layer does not receive the acknowledgment signal from the second electronic device within a preset time duration.

9. The page display method of claim 5, wherein the acknowledgment signal is determined not received after a preset time duration is exceeded.

10. The page display method of claim 1, wherein the display operation initiated by the user on the first page comprises selection from a pop-up window on the first electronic device.

11. The page display method of claim 2, further comprising running, in response to the local display instruction, the running application program in a background of the first electronic device.

12. The page display method of claim 11, wherein displaying the second page on the first electronic device in response to receiving the local display instruction comprises:

starting, by the first electronic device and based on a page type of the second page, an associated program corresponding to the page type;

running the associated program at the application layer; and displaying the second page through the associated program.

13. The page display method of claim 3, further comprising running, in response to the local display instruction, the running application program in a background of the first electronic device.

14. The page display method of claim 13, wherein displaying the second page on the first electronic device in response to receiving the local display instruction comprises:

starting, by the first electronic device and based on a page type of the second page, an associated program corresponding to the page type;

running the associated program at the application layer; and displaying the second page through the associated program.

15. The page display method of claim 5, further comprising running, in response to the local display instruction, the running application program in a background of the first electronic device.

16. The page display method of claim 15, wherein displaying the second page on the first electronic device in response to receiving the local display instruction comprises:
- starting, by the first electronic device and based on a page type of the second page, an associated program corresponding to the page type;
- running the associated program at the application layer; and
- displaying the second page through the associated program.

17. The page display method of claim 7, further comprising running, in response to the local display instruction, the running application program in a background of the first electronic device.

18. The page display method of claim 17, wherein displaying the second page on the first electronic device in response to receiving the local display instruction comprises:
- starting, by the first electronic device and based on a page type of the second page, an associated program corresponding to the page type;
- running the associated program at the application layer; and
- displaying the second page through the associated program.

\* \* \* \* \*